United States Patent
Sn

(10) Patent No.: US 11,281,447 B2
(45) Date of Patent: Mar. 22, 2022

(54) SERVICE GRAPHS FOR CANARY DEPLOYMENT SYSTEMS AND METHODS

(71) Applicant: Citrix Systems, Inc., Fort Lauderdale, FL (US)

(72) Inventor: Raghav Sn, Bengaluru (IN)

(73) Assignee: Citrix Systems, Inc., Fort Lauderdale, FL (US)

( * ) Notice: Subject to any disclaimer, the term of this patent is extended or adjusted under 35 U.S.C. 154(b) by 274 days.

(21) Appl. No.: 16/719,105

(22) Filed: Dec. 18, 2019

(65) Prior Publication Data

US 2021/0191706 A1 Jun. 24, 2021

(51) Int. Cl.
*G06F 8/65* (2018.01)
*G06F 9/24* (2006.01)

(52) U.S. Cl.
CPC . *G06F 8/65* (2013.01); *G06F 9/24* (2013.01)

(58) Field of Classification Search
None
See application file for complete search history.

(56) References Cited

U.S. PATENT DOCUMENTS

| | | | | |
|---|---|---|---|---|
| 10,411,973 B2 * | 9/2019 | Brown | | H04L 41/5035 |
| 11,063,847 B2 * | 7/2021 | Wang | | H04L 41/12 |
| 2014/0379901 A1 * | 12/2014 | Tseitlin | | H04L 41/5096 709/224 |
| 2016/0162909 A1 * | 6/2016 | Akolkar | | G06Q 30/0202 705/7.29 |
| 2017/0046146 A1 * | 2/2017 | Jamjoom | | G06F 8/71 |
| 2019/0034315 A1 * | 1/2019 | Acosta | | G06F 11/3409 |
| 2019/0340059 A1 * | 11/2019 | Bagarolo | | G06F 11/0772 |
| 2020/0366580 A1 * | 11/2020 | Sinha | | H04L 43/045 |
| 2021/0191706 A1 * | 6/2021 | Sn | | G06F 11/3466 |

OTHER PUBLICATIONS

Ma, "Using Service Dependency Graph to Analyze and Test Microservices", 2018, 42nd IEEE International Conference on Computer Software & Applications (Year: 2018).*
International Search Report and Written Opinion on PCT Appl. No. PCT/US2020/063753 dated Apr. 14, 2021.

* cited by examiner

*Primary Examiner* — Hossain M Morshed
(74) *Attorney, Agent, or Firm* — Foley & Lardner LLP

(57) ABSTRACT

Described embodiments provide systems and methods for generating service graphs for canary deployment of microservices is provided. A call chain can include a canary version of a microservice and one or more production versions of microservices. The canary version microservice can receive a request and include into header portion of the request an identifier indicating the microservice is the canary version of the microservice. The microservice can provide, to the one or more subsequent microservices of the call chain, the request with the identifier. The one or more subsequent microservices can include one or more tags in the request to identify that the one or more subsequent microservices are executing the production versions while retaining the identifier with the request. A service graph can be generated identifying transactions processed by the canary version microservice and the production versions of the one or more subsequent microservices.

20 Claims, 12 Drawing Sheets

SERVICE GRAPHS FOR CANARY DEPLOYMENT SYSTEMS AND METHODS

BACKGROUND

Devices can include or use a plurality of software applications to perform a variety of different functions. The applications can be built a single, autonomous unit such that the applications are self-contained and independent from other applications executing on a device. However, to update the applications, changes can impact the entire application or device executing the respective application. For example, a modification to a small section of code can require building and deploying an entirely new version of software for the application.

SUMMARY

The present disclosure is directed towards generating service graphs for canary deployments of microservices. In a microservice architecture, network traffic and client requests can be passed through a series or network of microservices (e.g., call chain) and one or more of the microservice can process the request. The microservices can be modified, upgraded or replaced using canary deployment. In embodiments, a canary version of a microservice can be deployed within a call chain of a plurality of microservices to individually upgrade the respective microservice in the call chain or network independent of the other microservices. The canary version microservices can tag or include an identifier in a header of a request when processing the request to identify that canary version microservice performed the respective transaction. The transactions performed by the microservices in the call chain including both canary version microservices and production version microservices can be monitored and parameters for the transaction can be collected. A service graph can be generated based in part on the identifiers and using the parameters to differentiate between transactions processed by canary version microservices and transactions processed by production version microservices. The service graph can be used to determine and identify issues or problems with the canary version microservices being introduced to the call chain.

In at least one aspect, a method for monitoring multiple versions of microservices is provided. The method can include receiving, by a first microservice of a plurality of microservices forming a first call chain, a request from a client. The first microservice can execute a canary version of the first microservice and one or more subsequent microservices of the first call chain can execute production versions of the one or more subsequent microservices. The method can include including, by the first microservice, into a header portion of the request an identifier indicating the first microservice is the canary version of the first microservice. The method can include providing, by the first microservice to the one or more subsequent microservices of the first call chain, the request with the identifier. The one or more subsequent microservices can include one or more tags in the request to identify that the one or more subsequent microservices are executing the production versions of the one or more subsequent microservices while retaining the identifier with the request as the request is processed by the one or more subsequent microservices forming the first call chain. The method can include generating, by a device intermediary to the plurality of microservices, a service graph identifying transactions processed by the canary version of the first microservice and the production versions of the one or more subsequent microservices.

In embodiments, the method can include deploying, by the device, the first microservice executing the canary version of the first microservice in the first call chain to process a first portion of requests from one or more clients and deploying, by the device, the first microservice executing a production version of the first microservice in a second call chain to process a second portion of requests from the one or more clients. The method can include generating, by the device, the service graph including parameters of the transactions processed by the first call chain including the first microservice executing the canary version of the first microservice and the parameters of the transactions processed by a second call chain including the first microservice executing a production version of the first microservice. The parameters of the transactions can include a response time of the respective microservice performing one or more transactions.

The method can include identifying, by the device using the identifier, one or more transactions performed by the first microservice executing the canary version of the first microservice and one or more transactions performed by the one or more subsequent microservices executing the production versions of the one or more subsequent microservices. The method can include generating, by the device, the service graph to include a first indicator for the one or more transactions performed by the first microservice executing the canary version of the first microservice and a second indicator for the one or more transactions performed by the one or more subsequent microservices executing the production versions of the one or more subsequent microservices. The method can include determining, by the device using the service graph, one or more differences between parameters of the transactions performed by the first microservice executing the canary version of the first microservice and parameters of the transactions performed by the one or more subsequent microservices executing the production versions of the one or more subsequent microservices.

In embodiments, the method can include inserting, by the first microservice, the identifier into at least one of a Hypertext Transfer Protocol (HTTP) header portion of the request or a Hypertext Transfer Protocol Secure (HTTPS) header portion of the request. The method can include generating, by the device, the service graph of the first call chain to identify a failure between the plurality of microservices, a number of times each microservice of the plurality of microservices has been called, and a rate of success of using the plurality of microservices of the first call chain.

In at least one aspect, a system for monitoring multiple versions of microservices is provided. The system can include a device having one or more processors, coupled to memory and intermediary to a plurality of microservices forming a first call chain. The system can include a first microservice of the plurality of microservices executing a canary version of the first microservice and one or more subsequent microservices of the first call chain executing production versions of the one or more subsequent microservices. The first microservice can be configured to receive a request from a client. The first microservice can be configured to include into a header portion of the request an identifier indicating the first microservice is the canary version of the first microservice. The first microservice can be configured to provide, to the one or more subsequent microservices of the first call chain, the request with the identifier. The one or more subsequent microservices can include one or more tags in the request to identify that the one or more subsequent microservices are executing the production versions of the one or more subsequent microservices while retaining the identifier with the request as the request is processed by the one or more subsequent microservices forming the first call chain. The device can be configured to generate a service graph identifying transactions processed by the canary version of the first microservice and the production versions of the one or more subsequent microservices.

In embodiments, the device can be configured to deploy the first microservice executing the canary version of the first microservice in the first call chain to process a first portion of requests from one or more clients and deploy the first microservice executing a production version of the first microservice in a second call chain to process a second portion of requests from the one or more clients. The device can be configured to generate the service graph to include parameters of the transactions processed by the first call chain including the first microservice executing the canary version of the first microservice and the parameters of the transactions processed by a second call chain including the first microservice executing a production version of the first microservice. The parameters of the transactions can include a response time of the respective microservice performing one or more transactions.

The device can be configured to identify, using the identifier, one or more transactions performed by the first microservice executing the canary version of the first microservice and one or more transactions performed by the one or more subsequent microservices executing the production versions of the one or more subsequent microservices. The device can be configured to generate the service graph to include a first indicator for the one or more transactions performed by the first microservice executing the canary version of the first microservice and a second indicator for the one or more transactions performed by the one or more subsequent microservices executing the production versions of the one or more subsequent microservices. The device can be configured to determine, using the service graph, one or more differences between parameters of the transactions performed by the first microservice executing the canary version of the first microservice and parameters of the transactions performed by the one or more subsequent microservices executing the production versions of the one or more subsequent microservices.

In embodiments, the device can be configured to insert the identifier into at least one of a Hypertext Transfer Protocol (HTTP) header portion of the request or a Hypertext Transfer Protocol Secure (HTTPS) header portion of the request. The device can be configured to generate the service graph of the first call chain to identify a failure between the plurality of microservices, a number of times each microservice of the plurality of microservices has been called, and a rate of success of using the plurality of microservices of the first call chain.

In at least one aspect, a non-transitory computer readable medium is provided. The non-transitory computer readable medium can store program instructions for causing one or more processors to receive at a first microservice of a plurality of microservices forming a first call chain, a request from a client. The first microservice can execute a canary version of the first microservice and one or more subsequent microservices of the first call chain can execute production versions of the one or more subsequent microservices. The instructions can cause the one or more processors to include into a header portion of the request an identifier indicating the first microservice is the canary version of the first microservice. The instructions can cause the one or more processors to provide, to the one or more subsequent microservices of the first call chain, the request with the identifier. The one or more subsequent microservices can include one or more tags in the request to identify that the one or more subsequent microservices are executing the production versions of the one or more subsequent microservices while retaining the identifier with the request as the request is processed by the one or more subsequent microservices forming the first call chain. The instructions can cause the one or more processors to generate a service graph identifying transactions processed by the canary version of the first microservice and the production versions of the one or more subsequent microservices.

In embodiments, the instructions can cause the one or more processors to generate the service graph including parameters of the transactions processed by the first call chain including the first microservice executing the canary version of the first microservice and the parameters of the transactions processed by a second call chain including the first microservice executing a production version of the first microservice.

BRIEF DESCRIPTION OF THE DRAWING FIGURES

Objects, aspects, features, and advantages of embodiments disclosed herein will become more fully apparent from the following detailed description, the appended claims, and the accompanying drawing figures in which like reference numerals identify similar or identical elements. Reference numerals that are introduced in the specification in association with a drawing figure may be repeated in one or more subsequent figures without additional description in the specification in order to provide context for other features, and not every element may be labeled in every figure. The drawing figures are not necessarily to scale, emphasis instead being placed upon illustrating embodiments, principles and concepts. The drawings are not intended to limit the scope of the claims included herewith.

Figure 5A:
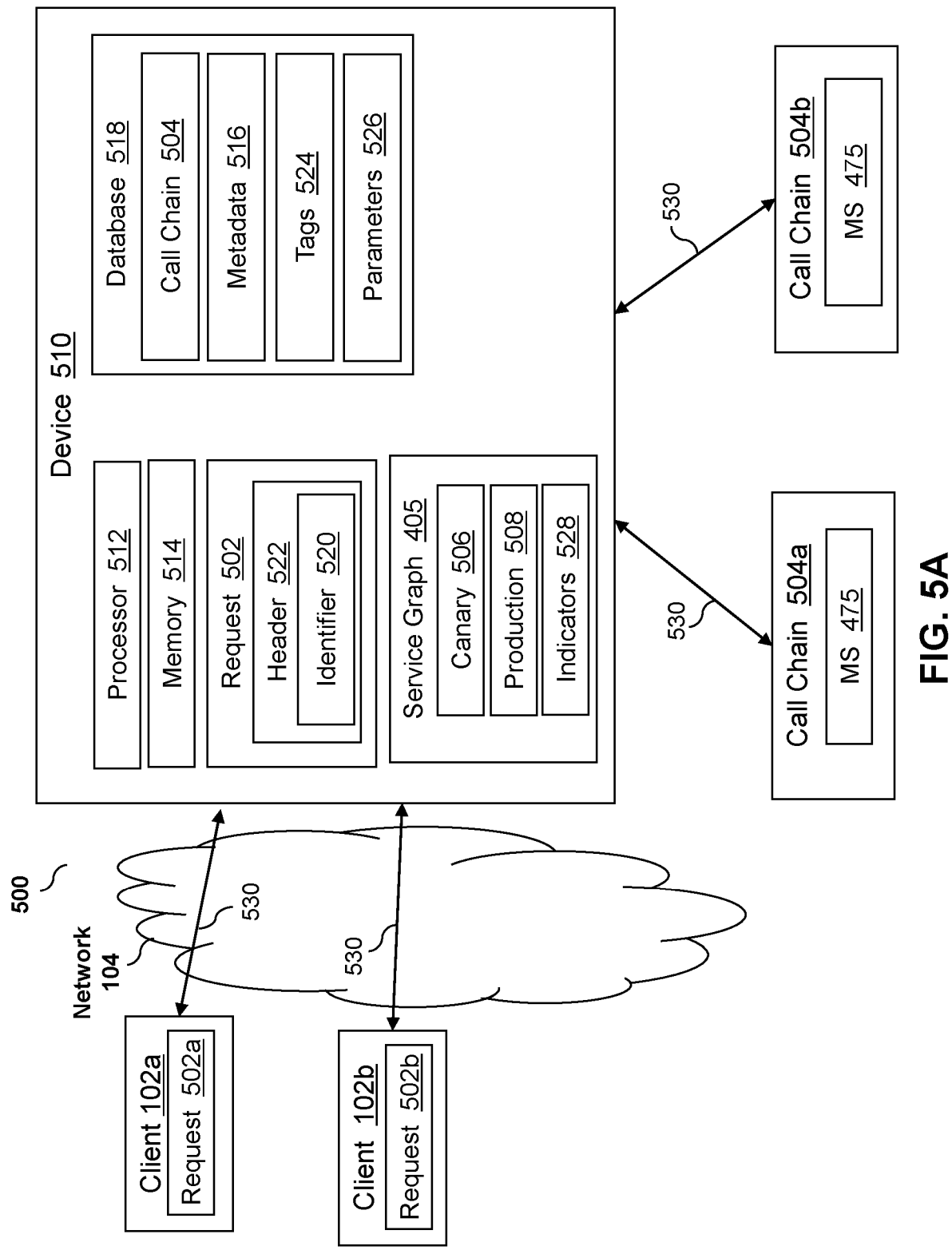
FIG. 5A is a block diagram of an intermediary device, intermediary to a plurality of clients and a plurality of call chains including a plurality of microservices 475, in accordance with an illustrative embodiment.
Figure 5B:
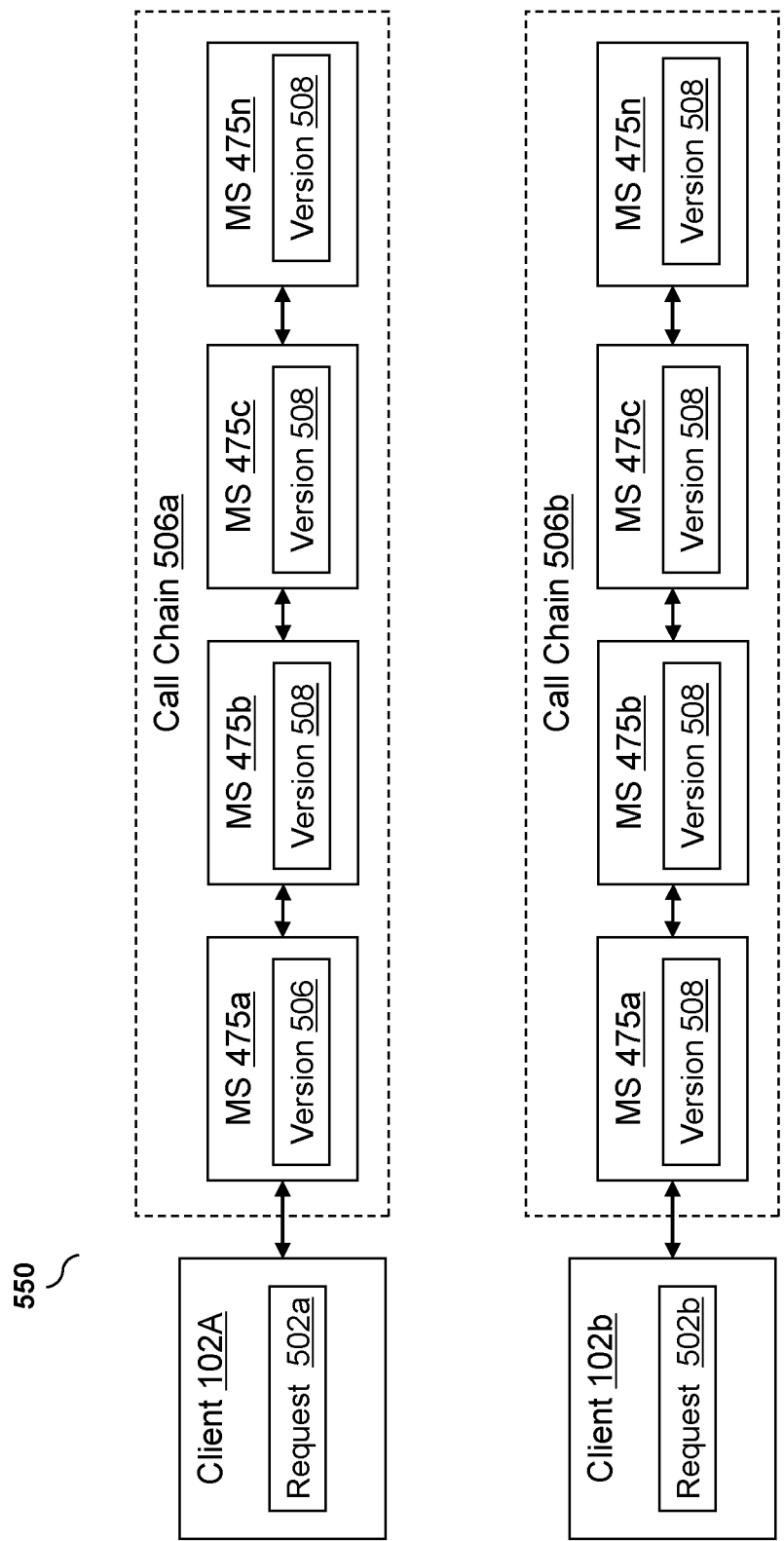
Figure 6A:
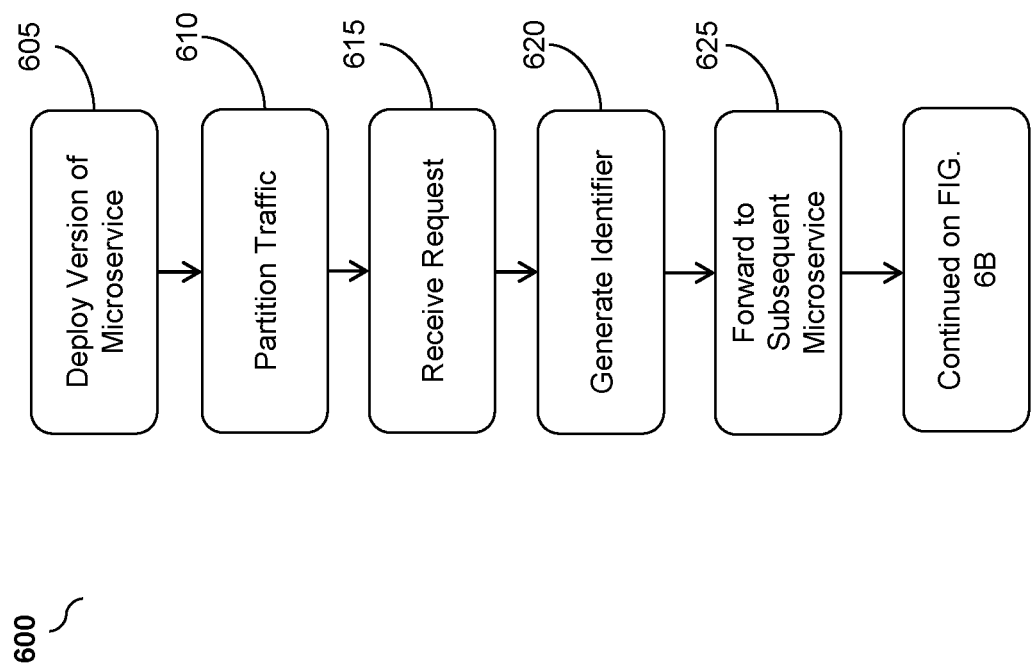
Figure 6B:
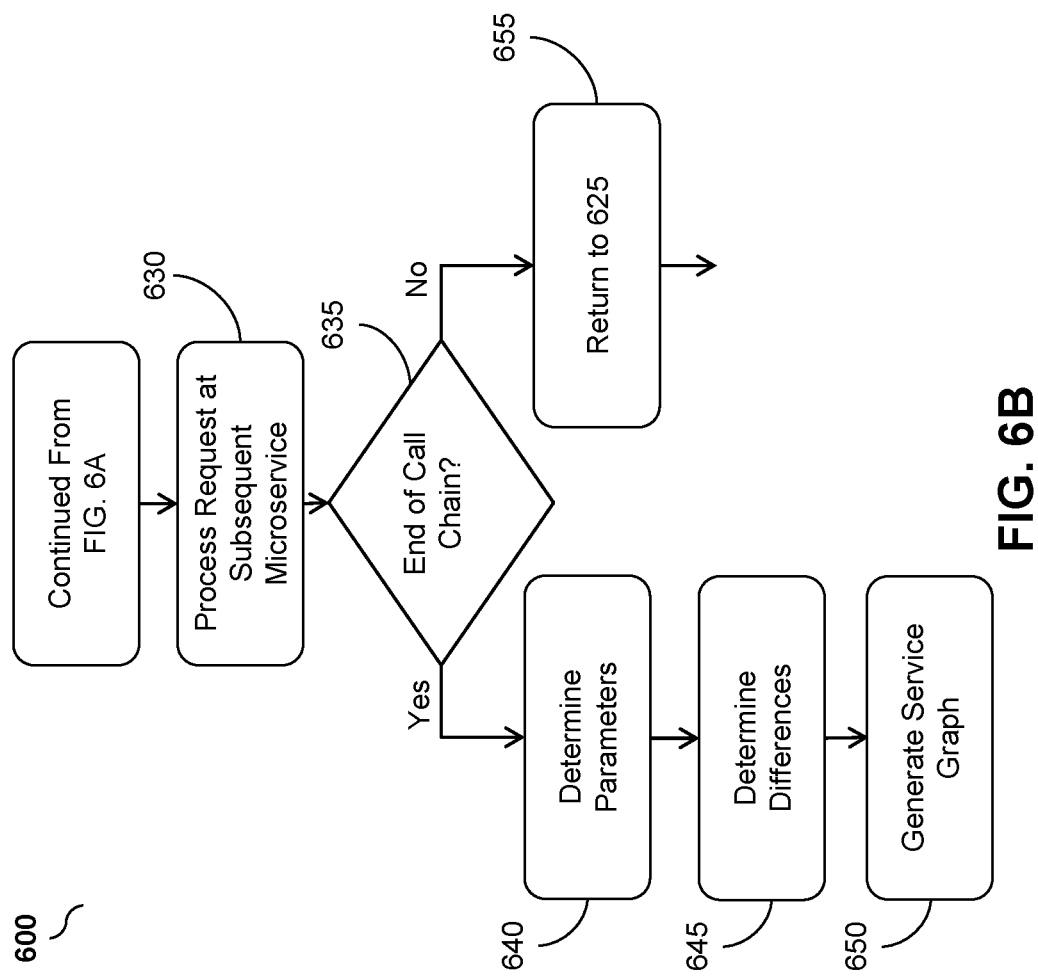

FIG. 5B is a block diagram of call chains including a plurality of microservices for processing requests from a plurality of clients, in accordance with an illustrative embodiment; and FIGS. 6A-6B are a flow diagram of a method for generating a service graph to differentiate between canary versions of microservices and production versions of microservices, in accordance with an illustrative embodiment.

The features and advantages of the present solution will become more apparent from the detailed description set forth below when taken in conjunction with the drawings, in which like reference characters identify corresponding elements throughout. In the drawings, like reference numbers generally indicate identical, functionally similar, and/or structurally similar elements.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein;

Section B describes embodiments of systems and methods for delivering a computing environment to a remote user;

Section C describes embodiments of systems and methods for virtualizing an application delivery controller;

Section D describes implementation of systems and methods for a service graph based platform and technology; and Section E describes embodiments of systems and methods for generating a service graph to differentiate between canary versions of microservices and production versions of microservices.

A. Network and Computing Environment

Figure 1A:
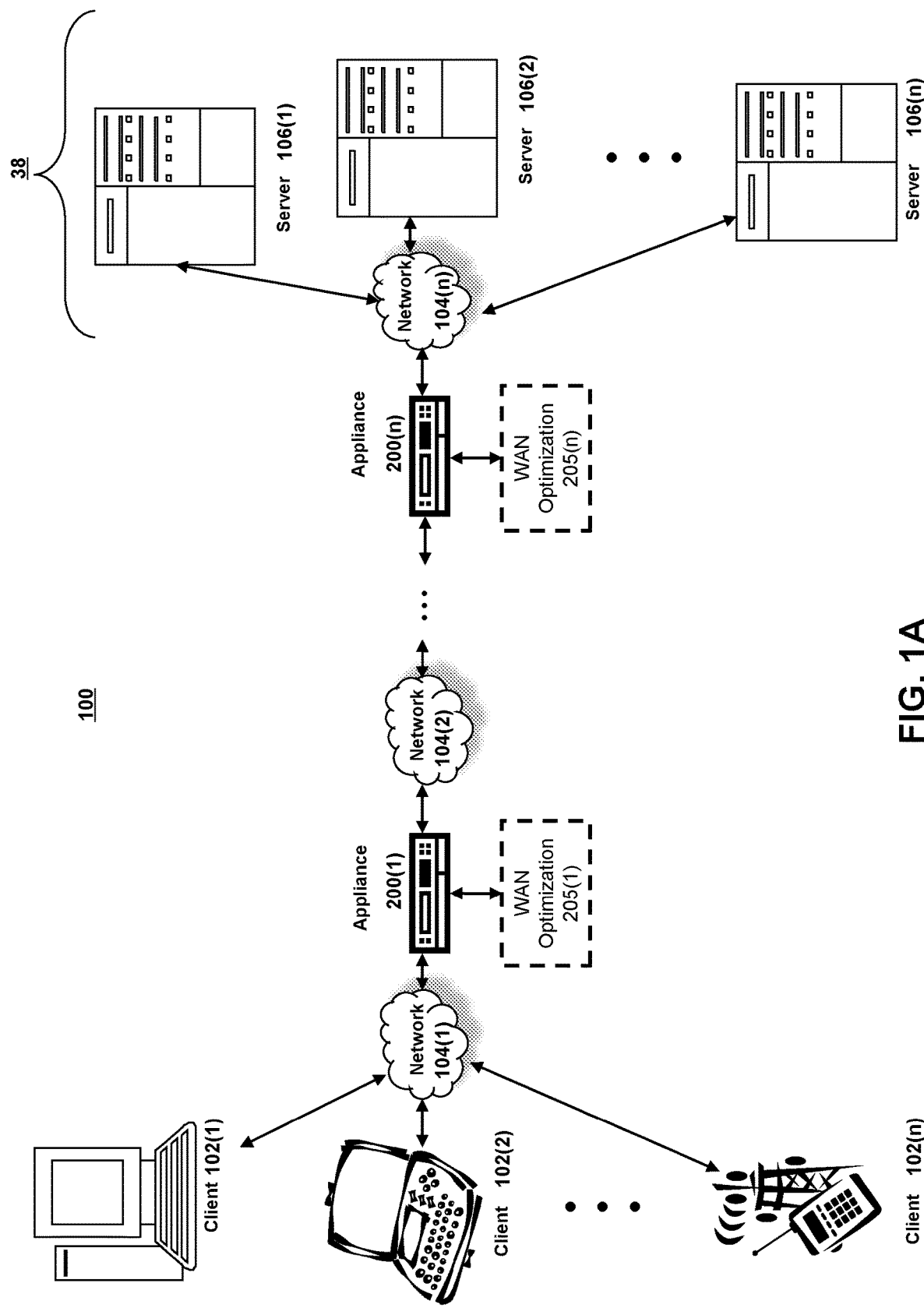
FIG. 1A is a block diagram of a network computing system, in accordance with an illustrative embodiment.

Referring to FIG. 1A, an illustrative network environment 100 is depicted. Network environment 100 may include one or more clients 102(1)-102(n) (also generally referred to as local machine(s) 102 or client(s) 102) in communication with one or more servers 106(1)-106(n) (also generally referred to as remote machine(s) 106 or server(s) 106) via one or more networks 104(1)-104n (generally referred to as network(s) 104). In some embodiments, a client 102 may communicate with a server 106 via one or more appliances 200(1)-200n (generally referred to as appliance(s) 200 or gateway(s) 200).

Although the embodiment shown in FIG. 1A shows one or more networks 104 between clients 102 and servers 106, in other embodiments, clients 102 and servers 106 may be on the same network 104. The various networks 104 may be the same type of network or different types of networks. For example, in some embodiments, network 104(1) may be a private network such as a local area network (LAN) or a company Intranet, while network 104(2) and/or network 104(n) may be a public network, such as a wide area network (WAN) or the Internet. In other embodiments, both network 104(1) and network 104(n) may be private networks. Networks 104 may employ one or more types of physical networks and/or network topologies, such as wired and/or wireless networks, and may employ one or more communication transport protocols, such as transmission control protocol (TCP), internet protocol (IP), user datagram protocol (UDP) or other similar protocols.

As shown in FIG. 1A, one or more appliances 200 may be located at various points or in various communication paths of network environment 100. For example, appliance 200 may be deployed between two networks 104(1) and 104(2), and appliances 200 may communicate with one another to work in conjunction to, for example, accelerate network traffic between clients 102 and servers 106. In other embodiments, the appliance 200 may be located on a network 104. For example, appliance 200 may be implemented as part of one of clients 102 and/or servers 106. In an embodiment, appliance 200 may be implemented as a network device such as Citrix networking (formerly NetScaler®) products sold by Citrix Systems, Inc. of Fort Lauderdale, Fla.

As shown in FIG. 1A, one or more servers 106 may operate as a server farm 38. Servers 106 of server farm 38 may be logically grouped, and may either be geographically co-located (e.g., on premises) or geographically dispersed (e.g., cloud based) from clients 102 and/or other servers 106. In an embodiment, server farm 38 executes one or more applications on behalf of one or more of clients 102 (e.g., as an application server), although other uses are possible, such as a file server, gateway server, proxy server, or other similar server uses. Clients 102 may seek access to hosted applications on servers 106.

As shown in FIG. 1A, in some embodiments, appliances 200 may include, be replaced by, or be in communication with, one or more additional appliances, such as WAN optimization appliances 205(1)-205(n), referred to generally as WAN optimization appliance(s) 205. For example, WAN optimization appliance 205 may accelerate, cache, compress or otherwise optimize or improve performance, operation, flow control, or quality of service of network traffic, such as traffic to and/or from a WAN connection, such as optimizing Wide Area File Services (WAFS), accelerating Server Message Block (SMB) or Common Internet File System (CIFS). In some embodiments, appliance 205 may be a performance enhancing proxy or a WAN optimization controller. In one embodiment, appliance 205 may be implemented as Citrix SD-WAN products sold by Citrix Systems, Inc. of Fort Lauderdale, Fla.

Figure 1B:
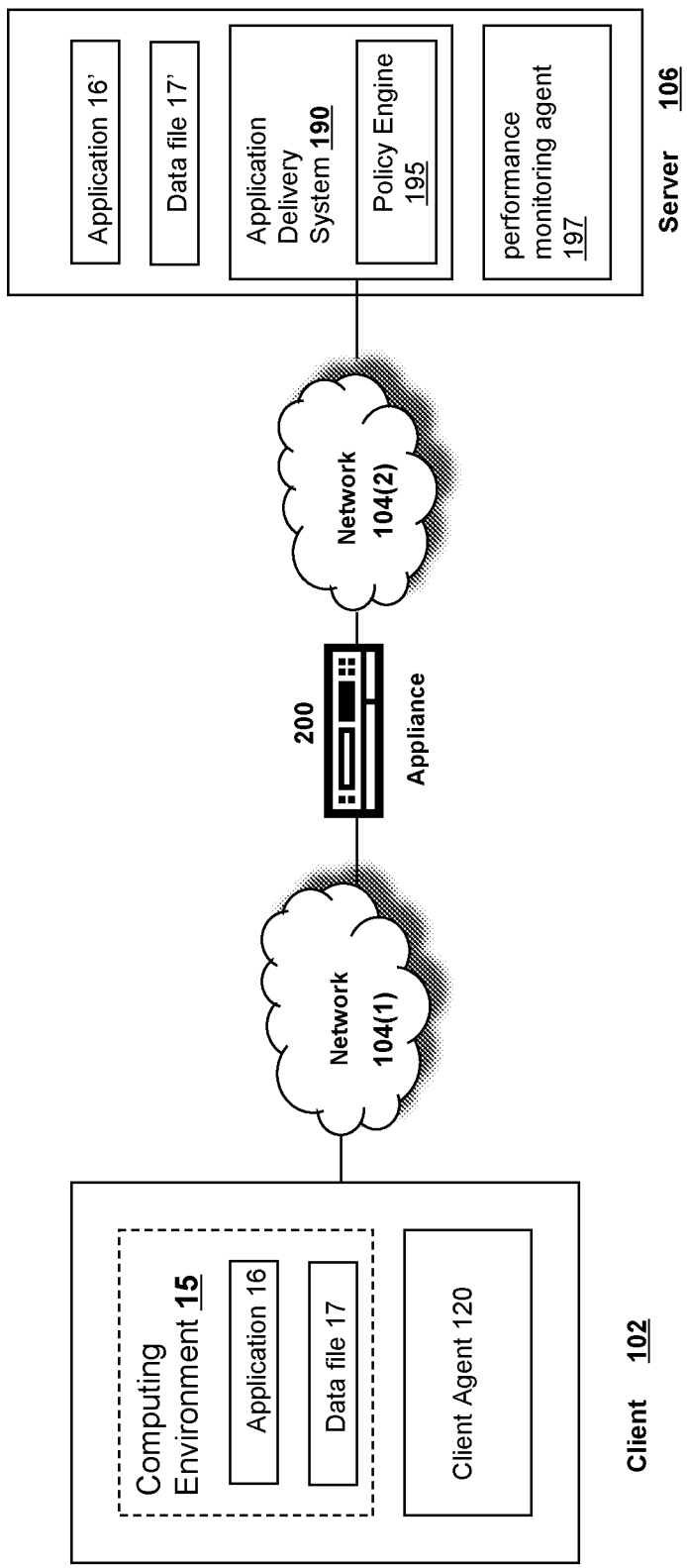
FIG. 1B is a block diagram of a network computing system for delivering a computing environment from a server to a client via an appliance, in accordance with an illustrative embodiment.

Referring to FIG. 1B, an example network environment, 100', for delivering and/or operating a computing network environment on a client 102 is shown. As shown in FIG. 1B, a server 106 may include an application delivery system 190 for delivering a computing environment, application, and/or data files to one or more clients 102. Client 102 may include client agent 120 and computing environment 15. Computing environment 15 may execute or operate an application, 16, that accesses, processes or uses a data file 17. Computing environment 15, application 16 and/or data file 17 may be delivered via appliance 200 and/or the server 106.

Appliance 200 may accelerate delivery of all or a portion of computing environment 15 to a client 102, for example by the application delivery system 190. For example, appliance 200 may accelerate delivery of a streaming application and data file processable by the application from a data center to a remote user location by accelerating transport layer traffic between a client 102 and a server 106. Such acceleration may be provided by one or more techniques, such as: 1) transport layer connection pooling, 2) transport layer connection multiplexing, 3) transport control protocol buffering, 4) compression, 5) caching, or other techniques. Appliance 200 may also provide load balancing of servers 106 to process requests from clients 102, act as a proxy or access server to provide access to the one or more servers 106, provide security and/or act as a firewall between a client 102 and a server 106, provide Domain Name Service (DNS) resolution, provide one or more virtual servers or virtual internet protocol servers, and/or provide a secure virtual private network (VPN) connection from a client 102 to a server 106, such as a secure socket layer (SSL) VPN connection and/or provide encryption and decryption operations.

Application delivery management system 190 may deliver computing environment 15 to a user (e.g., client 102), remote or otherwise, based on authentication and authorization policies applied by policy engine 195. A remote user may obtain a computing environment and access to server stored applications and data files from any network-connected device (e.g., client 102). For example, appliance 200 may request an application and data file from server 106. In response to the request, application delivery system 190 and/or server 106 may deliver the application and data file to client 102, for example via an application stream to operate in computing environment 15 on client 102, or via a remote-display protocol or otherwise via remote-based or server-based computing. In an embodiment, application delivery system 190 may be implemented as any portion of the Citrix Workspace Suite™ by Citrix Systems, Inc., such as Citrix Virtual Apps and Desktops (formerly XenApp® and XenDesktop®).

Policy engine 195 may control and manage the access to, and execution and delivery of, applications. For example, policy engine 195 may determine the one or more applications a user or client 102 may access and/or how the application should be delivered to the user or client 102, such as a server-based computing, streaming or delivering the application locally to the client 120 for local execution.

For example, in operation, a client 102 may request execution of an application (e.g., application 16') and application delivery system 190 of server 106 determines how to execute application 16', for example based upon credentials received from client 102 and a user policy applied by policy engine 195 associated with the credentials. For example, application delivery system 190 may enable client 102 to receive application-output data generated by execution of the application on a server 106, may enable client 102 to execute the application locally after receiving the application from server 106, or may stream the application via network 104 to client 102. For example, in some embodiments, the application may be a server-based or a remote-based application executed on server 106 on behalf of client 102. Server 106 may display output to client 102 using a thin-client or remote-display protocol, such as the Independent Computing Architecture (ICA) protocol by Citrix Systems, Inc. of Fort Lauderdale, Fla. The application may be any application related to real-time data communications, such as applications for streaming graphics, streaming video and/or audio or other data, delivery of remote desktops or workspaces or hosted services or applications, for example infrastructure as a service (IaaS), desktop as a service (DaaS), workspace as a service (WaaS), software as a service (SaaS) or platform as a service (PaaS).

One or more of servers 106 may include a performance monitoring service or agent 197. In some embodiments, a dedicated one or more servers 106 may be employed to perform performance monitoring. Performance monitoring may be performed using data collection, aggregation, analysis, management and reporting, for example by software, hardware or a combination thereof. Performance monitoring may include one or more agents for performing monitoring, measurement and data collection activities on clients 102 (e.g., client agent 120), servers 106 (e.g., agent 197) or an appliance 200 and/or 205 (agent not shown). In general, monitoring agents (e.g., 120 and/or 197) execute transparently (e.g., in the background) to any application and/or user of the device. In some embodiments, monitoring agent 197 includes any of the product embodiments referred to as Citrix Analytics or Citrix Application Delivery Management by Citrix Systems, Inc. of Fort Lauderdale, Fla.

The monitoring agents 120 and 197 may monitor, measure, collect, and/or analyze data on a predetermined frequency, based upon an occurrence of given event(s), or in real time during operation of network environment 100. The monitoring agents may monitor resource consumption and/or performance of hardware, software, and/or communications resources of clients 102, networks 104, appliances 200 and/or 205, and/or servers 106. For example, network connections such as a transport layer connection, network latency, bandwidth utilization, end-user response times, application usage and performance, session connections to an application, cache usage, memory usage, processor usage, storage usage, database transactions, client and/or server utilization, active users, duration of user activity, application crashes, errors, or hangs, the time required to log-in to an application, a server, or the application delivery system, and/or other performance conditions and metrics may be monitored.

The monitoring agents 120 and 197 may provide application performance management for application delivery system 190. For example, based upon one or more monitored performance conditions or metrics, application delivery system 190 may be dynamically adjusted, for example periodically or in real-time, to optimize application delivery by servers 106 to clients 102 based upon network environment performance and conditions.

In described embodiments, clients 102, servers 106, and appliances 200 and 205 may be deployed as and/or executed on any type and form of computing device, such as any desktop computer, laptop computer, or mobile device capable of communication over at least one network and performing the operations described herein. For example, clients 102, servers 106 and/or appliances 200 and 205 may each correspond to one computer, a plurality of computers, or a network of distributed computers such as computer 101 shown in FIG. 1C.

Figure 1C:
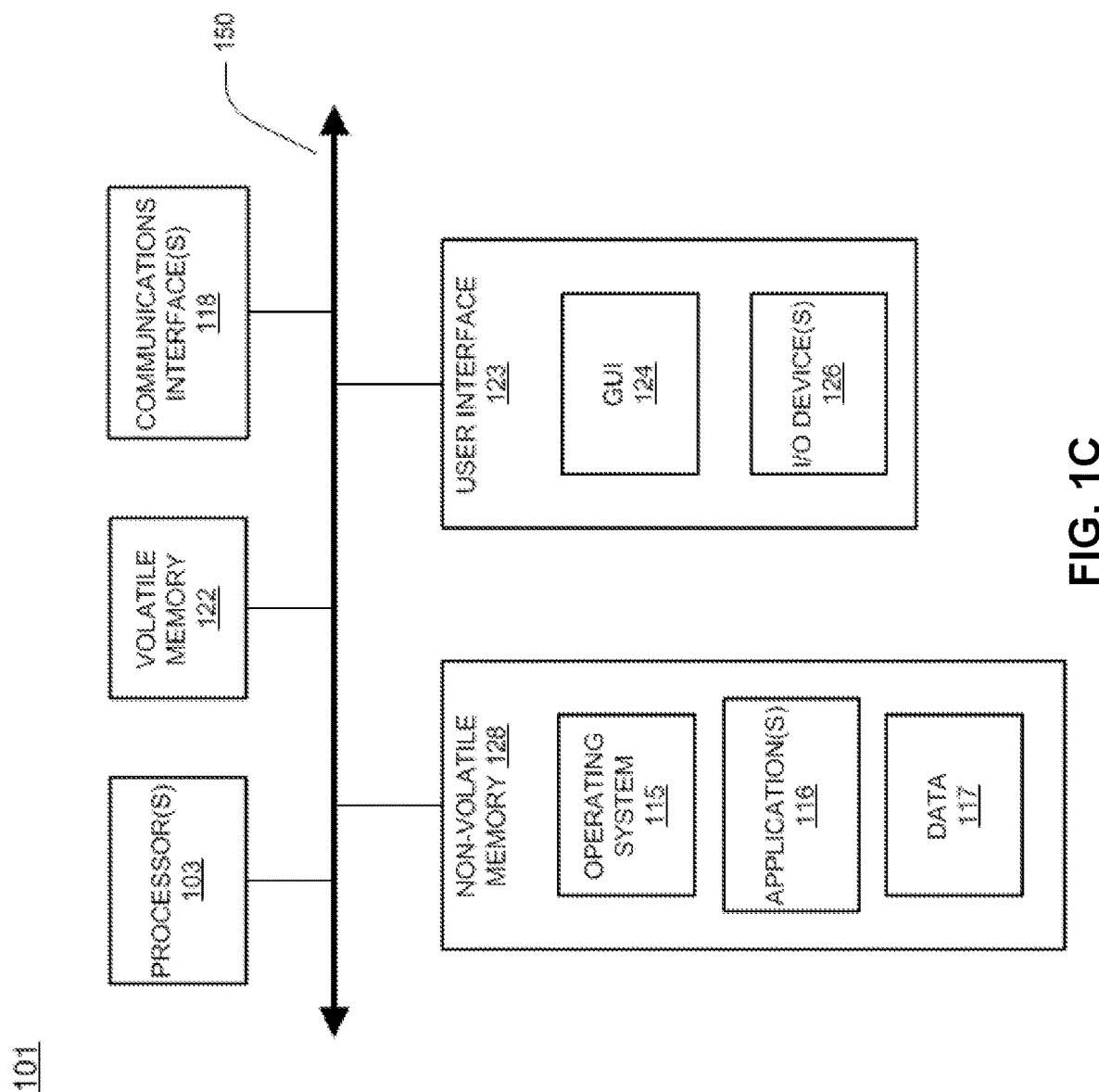
FIG. 1C is a block diagram of a computing device, in accordance with an illustrative embodiment.

As shown in FIG. 1C, computer 101 may include one or more processors 103, volatile memory 122 (e.g., RAM), non-volatile memory 128 (e.g., one or more hard disk drives (HDDs) or other magnetic or optical storage media, one or more solid state drives (SSDs) such as a flash drive or other solid state storage media, one or more hybrid magnetic and solid state drives, and/or one or more virtual storage volumes, such as a cloud storage, or a combination of such physical storage volumes and virtual storage volumes or arrays thereof), user interface (UI) 123, one or more communications interfaces 118, and communication bus 150. User interface 123 may include graphical user interface (GUI) 124 (e.g., a touchscreen, a display, etc.) and one or more input/output (I/O) devices 126 (e.g., a mouse, a keyboard, etc.). Non-volatile memory 128 stores operating system 115, one or more applications 116, and data 117 such that, for example, computer instructions of operating system 115 and/or applications 116 are executed by processor(s) 103 out of volatile memory 122. Data may be entered using an input device of GUI 124 or received from I/O device(s) 126. Various elements of computer 101 may communicate via communication bus 150. Computer 101 as shown in FIG. 1C is shown merely as an example, as clients 102, servers 106 and/or appliances 200 and 205 may be implemented by any computing or processing environment and with any type of machine or set of machines that may have suitable hardware and/or software capable of operating as described herein.

Processor(s) 103 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs), microprocessors, digital signal processors, microcontrollers, field programmable gate arrays (FPGAs), programmable logic arrays (PLAs), multi-core processors, or general-purpose computers with associated memory. The "processor" may be analog, digital or mixed-signal. In some embodiments, the "processor" may be one or more physical processors or one or more "virtual" (e.g., remotely located or "cloud") processors.

Communications interfaces 118 may include one or more interfaces to enable computer 101 to access a computer network such as a LAN, a WAN, or the Internet through a variety of wired and/or wireless or cellular connections.

In described embodiments, a first computing device 101 may execute an application on behalf of a user of a client computing device (e.g., a client 102), may execute a virtual machine, which provides an execution session within which applications execute on behalf of a user or a client computing device (e.g., a client 102), such as a hosted desktop session, may execute a terminal services session to provide a hosted desktop environment, or may provide access to a computing environment including one or more of: one or more applications, one or more desktop applications, and one or more desktop sessions in which one or more applications may execute.

B. Appliance Architecture

Figure 2:
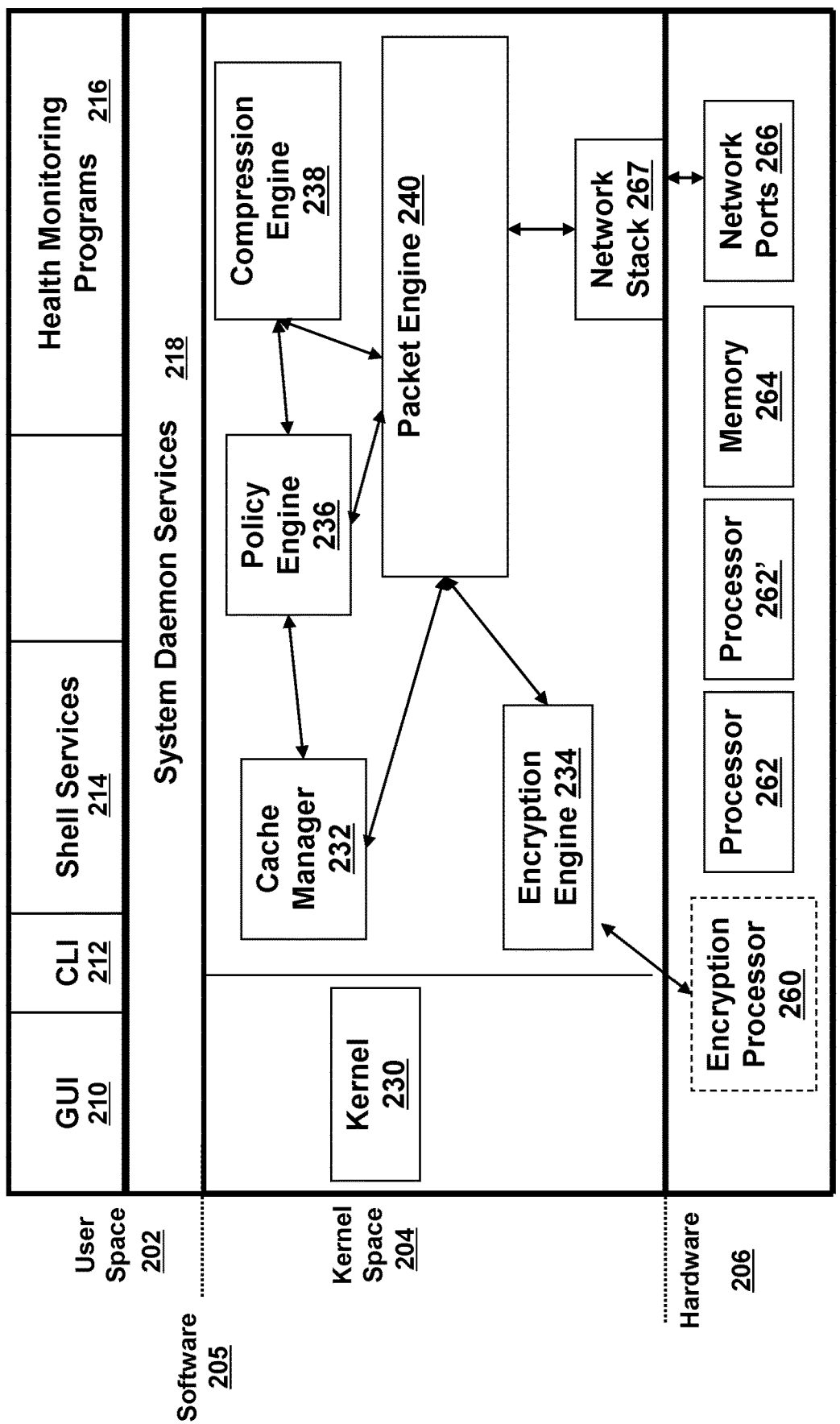
FIG. 2 is a block diagram of an appliance for processing communications between a client and a server, in accordance with an illustrative embodiment.

FIG. 2 shows an example embodiment of appliance 200. As described herein, appliance 200 may be implemented as a server, gateway, router, switch, bridge or other type of computing or network device. As shown in FIG. 2, an embodiment of appliance 200 may include a hardware layer 206 and a software layer 205 divided into a user space 202 and a kernel space 204. Hardware layer 206 provides the hardware elements upon which programs and services within kernel space 204 and user space 202 are executed and allow programs and services within kernel space 204 and user space 202 to communicate data both internally and externally with respect to appliance 200. As shown in FIG. 2, hardware layer 206 may include one or more processing units 262 for executing software programs and services, memory 264 for storing software and data, network ports 266 for transmitting and receiving data over a network, and encryption processor 260 for encrypting and decrypting data such as in relation to Secure Socket Layer (SSL) or Transport Layer Security (TLS) processing of data transmitted and received over the network.

An operating system of appliance 200 allocates, manages, or otherwise segregates the available system memory into kernel space 204 and user space 202. Kernel space 204 is reserved for running kernel 230, including any device drivers, kernel extensions or other kernel related software. As known to those skilled in the art, kernel 230 is the core of the operating system, and provides access, control, and management of resources and hardware-related elements of application 104. Kernel space 204 may also include a number of network services or processes working in conjunction with cache manager 232.

Appliance 200 may include one or more network stacks 267, such as a TCP/IP based stack, for communicating with client(s) 102, server(s) 106, network(s) 104, and/or other appliances 200 or 205. For example, appliance 200 may establish and/or terminate one or more transport layer connections between clients 102 and servers 106. Each network stack 267 may include a buffer 243 for queuing one or more network packets for transmission by appliance 200.

Kernel space 204 may include cache manager 232, packet engine 240, encryption engine 234, policy engine 236 and compression engine 238. In other words, one or more of processes 232, 240, 234, 236 and 238 run in the core address space of the operating system of appliance 200, which may reduce the number of data transactions to and from the memory and/or context switches between kernel mode and user mode, for example since data obtained in kernel mode may not need to be passed or copied to a user process, thread or user level data structure.

Cache manager 232 may duplicate original data stored elsewhere or data previously computed, generated or transmitted to reducing the access time of the data. In some embodiments, the cache memory may be a data object in memory 264 of appliance 200, or may be a physical memory having a faster access time than memory 264.

Policy engine 236 may include a statistical engine or other configuration mechanism to allow a user to identify, specify, define or configure a caching policy and access, control and management of objects, data or content being cached by appliance 200, and define or configure security, network traffic, network access, compression or other functions performed by appliance 200.

Encryption engine 234 may process any security related protocol, such as SSL or TLS. For example, encryption engine 234 may encrypt and decrypt network packets, or any portion thereof, communicated via appliance 200, may setup or establish SSL, TLS or other secure connections, for example between client 102, server 106, and/or other appliances 200 or 205. In some embodiments, encryption engine 234 may use a tunneling protocol to provide a VPN between a client 102 and a server 106. In some embodiments, encryption engine 234 is in communication with encryption processor 260. Compression engine 238 compresses network packets bi-directionally between clients 102 and servers 106 and/or between one or more appliances 200.

Packet engine 240 may manage kernel-level processing of packets received and transmitted by appliance 200 via network stacks 267 to send and receive network packets via network ports 266. Packet engine 240 may operate in conjunction with encryption engine 234, cache manager 232, policy engine 236 and compression engine 238, for example to perform encryption/decryption, traffic management such as request-level content switching and request-level cache redirection, and compression and decompression of data.

User space 202 is a memory area or portion of the operating system used by user mode applications or programs otherwise running in user mode. A user mode application may not access kernel space 204 directly and uses service calls in order to access kernel services. User space 202 may include graphical user interface (GUI) 210, a command line interface (CLI) 212, shell services 214, health monitor 216, and daemon services 218. GUI 210 and CLI 212 enable a system administrator or other user to interact with and control the operation of appliance 200, such as via the operating system of appliance 200. Shell services 214 include the programs, services, tasks, processes or executable instructions to support interaction with appliance 200 by a user via the GUI 210 and/or CLI 212.

Health monitor 216 monitors, checks, reports and ensures that network systems are functioning properly and that users are receiving requested content over a network, for example by monitoring activity of appliance 200. In some embodiments, health monitor 216 intercepts and inspects any network traffic passed via appliance 200. For example, health monitor 216 may interface with one or more of encryption engine 234, cache manager 232, policy engine 236, compression engine 238, packet engine 240, daemon services 218, and shell services 214 to determine a state, status, operating condition, or health of any portion of the appliance 200. Further, health monitor 216 may determine if a program, process, service or task is active and currently running, check status, error or history logs provided by any program, process, service or task to determine any condition, status or error with any portion of appliance 200. Additionally, health monitor 216 may measure and monitor the performance of any application, program, process, service, task or thread executing on appliance 200.

Daemon services 218 are programs that run continuously or in the background and handle periodic service requests received by appliance 200. In some embodiments, a daemon service may forward the requests to other programs or processes, such as another daemon service 218 as appropriate.

As described herein, appliance 200 may relieve servers 106 of much of the processing load caused by repeatedly opening and closing transport layer connections to clients 102 by opening one or more transport layer connections with each server 106 and maintaining these connections to allow repeated data accesses by clients via the Internet (e.g., "connection pooling"). To perform connection pooling, appliance 200 may translate or multiplex communications by modifying sequence numbers and acknowledgment numbers at the transport layer protocol level (e.g., "connection multiplexing"). Appliance 200 may also provide switching or load balancing for communications between the client 102 and server 106.

As described herein, each client 102 may include client agent 120 for establishing and exchanging communications with appliance 200 and/or server 106 via a network 104. Client 102 may have installed and/or execute one or more applications that are in communication with network 104. Client agent 120 may intercept network communications from a network stack used by the one or more applications. For example, client agent 120 may intercept a network communication at any point in a network stack and redirect the network communication to a destination desired, managed or controlled by client agent 120, for example to intercept and redirect a transport layer connection to an IP address and port controlled or managed by client agent 120. Thus, client agent 120 may transparently intercept any protocol layer below the transport layer, such as the network layer, and any protocol layer above the transport layer, such as the session, presentation or application layers. Client agent 120 can interface with the transport layer to secure, optimize, accelerate, route or load-balance any communications provided via any protocol carried by the transport layer.

In some embodiments, client agent 120 is implemented as an Independent Computing Architecture (ICA) client developed by Citrix Systems, Inc. of Fort Lauderdale, Fla. Client agent 120 may perform acceleration, streaming, monitoring, and/or other operations. For example, client agent 120 may accelerate streaming an application from a server 106 to a client 102. Client agent 120 may also perform end-point detection/scanning and collect end-point information about client 102 for appliance 200 and/or server 106. Appliance 200 and/or server 106 may use the collected information to determine and provide access, authentication and authorization control of the client's connection to network 104. For example, client agent 120 may identify and determine one or more client-side attributes, such as: the operating system and/or a version of an operating system, a service pack of the operating system, a running service, a running process, a file, presence or versions of various applications of the client, such as antivirus, firewall, security, and/or other software.

C. Systems and Methods for Providing Virtualized Application Delivery Controller Referring now to FIG. 3, a block diagram of a virtualized environment 300 is shown. As shown, a computing device 302 in virtualized environment 300 includes a virtualization layer 303, a hypervisor layer 304, and a hardware layer 307. Hypervisor layer 304 includes one or more hypervisors (or virtualization managers) 301 that allocates and manages access to a number of physical resources in hardware layer 307 (e.g., physical processor(s) 321 and physical disk(s) 328) by at least one virtual machine (VM) (e.g., one of VMs 306) executing in virtualization layer 303. Each VM 306 may include allocated virtual resources such as virtual processors 332 and/or virtual disks 342, as well as virtual resources such as virtual memory and virtual network interfaces. In some embodiments, at least one of VMs 306 may include a control operating system (e.g., 305) in communication with hypervisor 301 and used to execute applications for managing and configuring other VMs (e.g., guest operating systems 310) on device 302.

In general, hypervisor(s) 301 may provide virtual resources to an operating system of VMs 306 in any manner that simulates the operating system having access to a physical device. Thus, hypervisor(s) 301 may be used to emulate virtual hardware, partition physical hardware, virtualize physical hardware, and execute virtual machines that provide access to computing environments. In an illustrative embodiment, hypervisor(s) 301 may be implemented as a Citrix Hypervisor by Citrix Systems, Inc. of Fort Lauderdale, Fla. In an illustrative embodiment, device 302 executing a hypervisor that creates a virtual machine platform on which guest operating systems may execute is referred to as a host server. 302

Hypervisor 301 may create one or more VMs 306 in which an operating system (e.g., control operating system 305 and/or guest operating system 310) executes. For example, the hypervisor 301 loads a virtual machine image to create VMs 306 to execute an operating system. Hypervisor 301 may present VMs 306 with an abstraction of hardware layer 307, and/or may control how physical capabilities of hardware layer 307 are presented to VMs 306. For example, hypervisor(s) 301 may manage a pool of resources distributed across multiple physical computing devices.

In some embodiments, one of VMs 306 (e.g., the VM executing control operating system 305) may manage and configure other of VMs 306, for example by managing the execution and/or termination of a VM and/or managing allocation of virtual resources to a VM. In various embodiments, VMs may communicate with hypervisor(s) 301 and/or other VMs via, for example, one or more Application Programming Interfaces (APIs), shared memory, and/or other techniques.

In general, VMs 306 may provide a user of device 302 with access to resources within virtualized computing environment 300, for example, one or more programs, applications, documents, files, desktop and/or computing environments, or other resources. In some embodiments, VMs 306 may be implemented as fully virtualized VMs that are not aware that they are virtual machines (e.g., a Hardware Virtual Machine or HVM). In other embodiments, the VM may be aware that it is a virtual machine, and/or the VM may be implemented as a paravirtualized (PV) VM.

Figure 3:
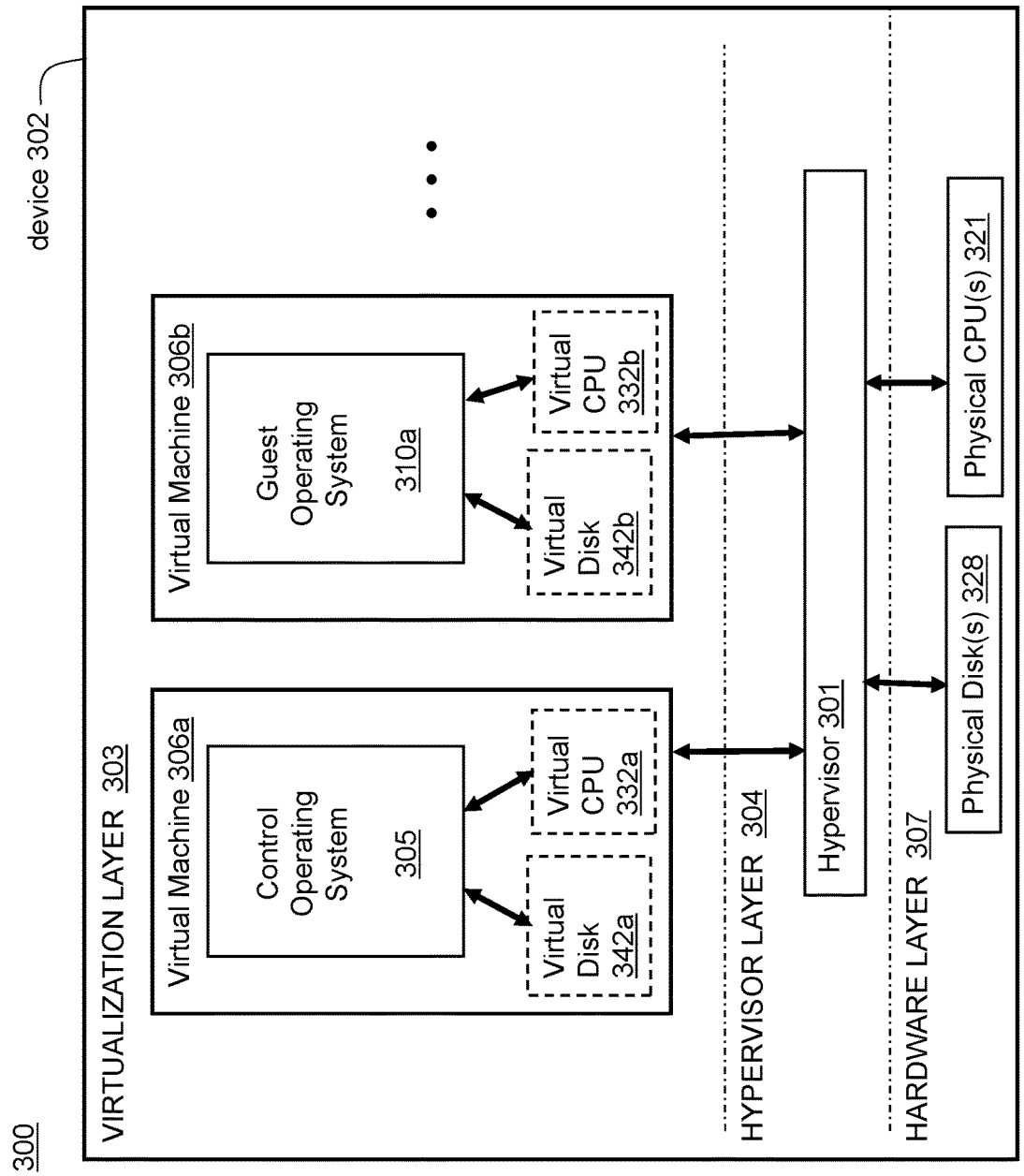
FIG. 3 is a block diagram of a virtualization environment, in accordance with an illustrative embodiment.

Although shown in FIG. 3 as including a single virtualized device 302, virtualized environment 300 may include a plurality of networked devices in a system in which at least one physical host executes a virtual machine. A device on which a VM executes may be referred to as a physical host and/or a host machine. For example, appliance 200 may be additionally or alternatively implemented in a virtualized environment 300 on any computing device, such as a client 102, server 106 or appliance 200. Virtual appliances may provide functionality for availability, performance, health monitoring, caching and compression, connection multiplexing and pooling and/or security processing (e.g., firewall, VPN, encryption/decryption, etc.), similarly as described in regard to appliance 200.

In some embodiments, a server may execute multiple virtual machines 306, for example on various cores of a multi-core processing system and/or various processors of a multiple processor device. For example, although generally shown herein as "processors" (e.g., in FIGS. 1C, 2 and 3), one or more of the processors may be implemented as either single- or multi-core processors to provide a multi-threaded, parallel architecture and/or multi-core architecture. Each processor and/or core may have or use memory that is allocated or assigned for private or local use that is only accessible by that processor/core, and/or may have or use memory that is public or shared and accessible by multiple processors/cores. Such architectures may allow work, task, load or network traffic distribution across one or more processors and/or one or more cores (e.g., by functional parallelism, data parallelism, flow-based data parallelism, etc.).

Further, instead of (or in addition to) the functionality of the cores being implemented in the form of a physical processor/core, such functionality may be implemented in a virtualized environment (e.g., 300) on a client 102, server 106 or appliance 200, such that the functionality may be implemented across multiple devices, such as a cluster of computing devices, a server farm or network of computing devices, etc. The various processors/cores may interface or communicate with each other using a variety of interface techniques, such as core to core messaging, shared memory, kernel APIs, etc.

In embodiments employing multiple processors and/or multiple processor cores, described embodiments may distribute data packets among cores or processors, for example to balance the flows across the cores. For example, packet distribution may be based upon determinations of functions performed by each core, source and destination addresses, and/or whether: a load on the associated core is above a predetermined threshold; the load on the associated core is below a predetermined threshold; the load on the associated core is less than the load on the other cores; or any other metric that can be used to determine where to forward data packets based in part on the amount of load on a processor.

For example, data packets may be distributed among cores or processes using receive-side scaling (RSS) in order to process packets using multiple processors/cores in a network. RSS generally allows packet processing to be balanced across multiple processors/cores while maintaining in-order delivery of the packets. In some embodiments, RSS may use a hashing scheme to determine a core or processor for processing a packet.

The RSS may generate hashes from any type and form of input, such as a sequence of values. This sequence of values can include any portion of the network packet, such as any header, field or payload of network packet, and include any tuples of information associated with a network packet or data flow, such as addresses and ports. The hash result or any portion thereof may be used to identify a processor, core, engine, etc., for distributing a network packet, for example via a hash table, indirection table, or other mapping technique.

Although shown in FIGS. 1A and 1B as being single appliances, appliances 200 may be implemented as one or more distributed or clustered appliances. Individual computing devices or appliances may be referred to as nodes of the cluster. A centralized management system may perform load balancing, distribution, configuration, or other tasks to allow the nodes to operate in conjunction as a single computing system. Such a cluster may be viewed as a single virtual appliance or computing device. A plurality of appliances 200 or other computing devices (e.g., nodes) may be joined into a single cluster. A cluster may operate as an application server, network storage server, backup service, or any other type of computing device to perform many of the functions of appliances 200 and/or 205.

D. Service Graph Based Platform and Technology

Figure 4A:
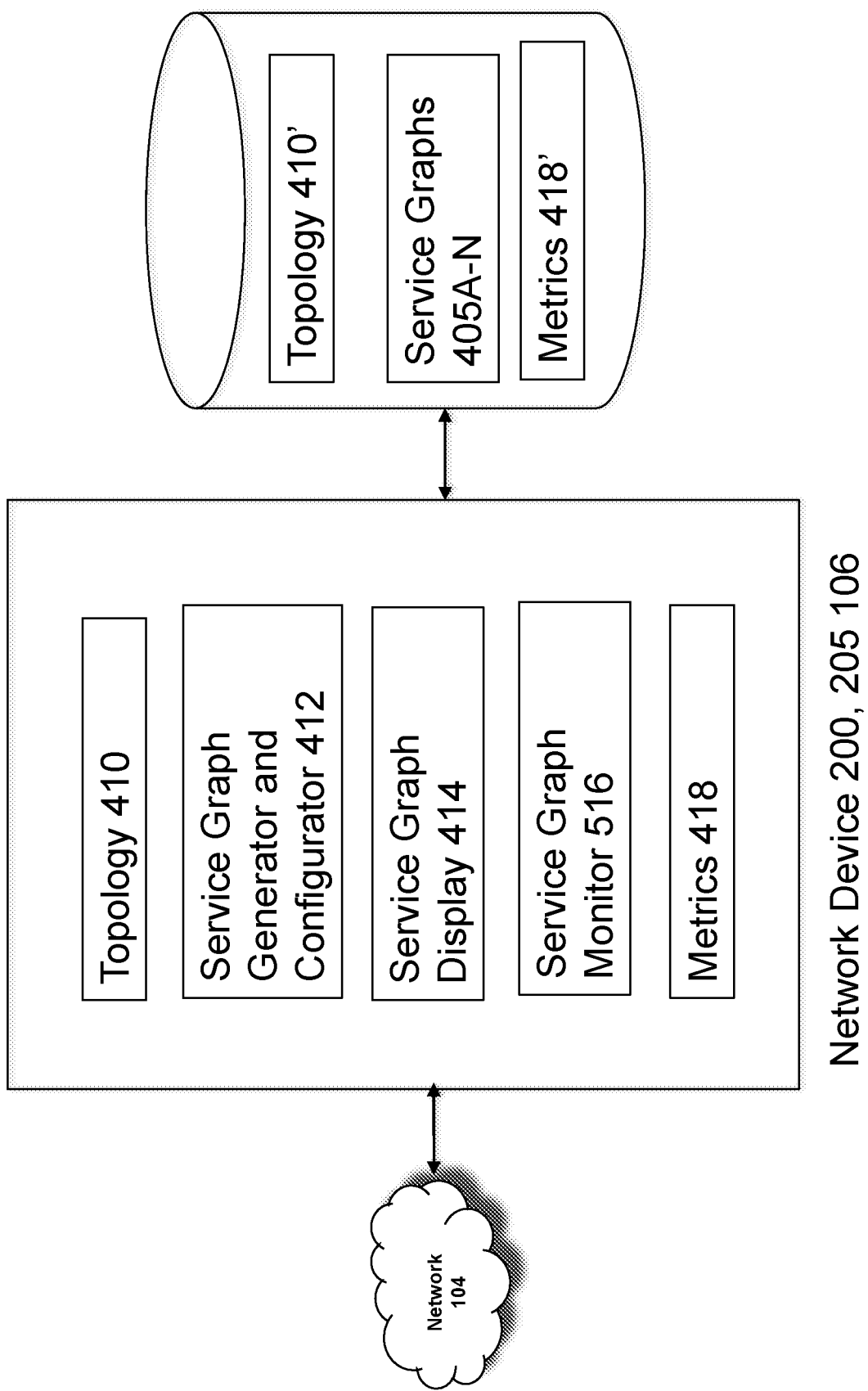
FIG. 4A is a block diagram of a service graph based system, in accordance with an illustrative embodiment.
Figure 4B:
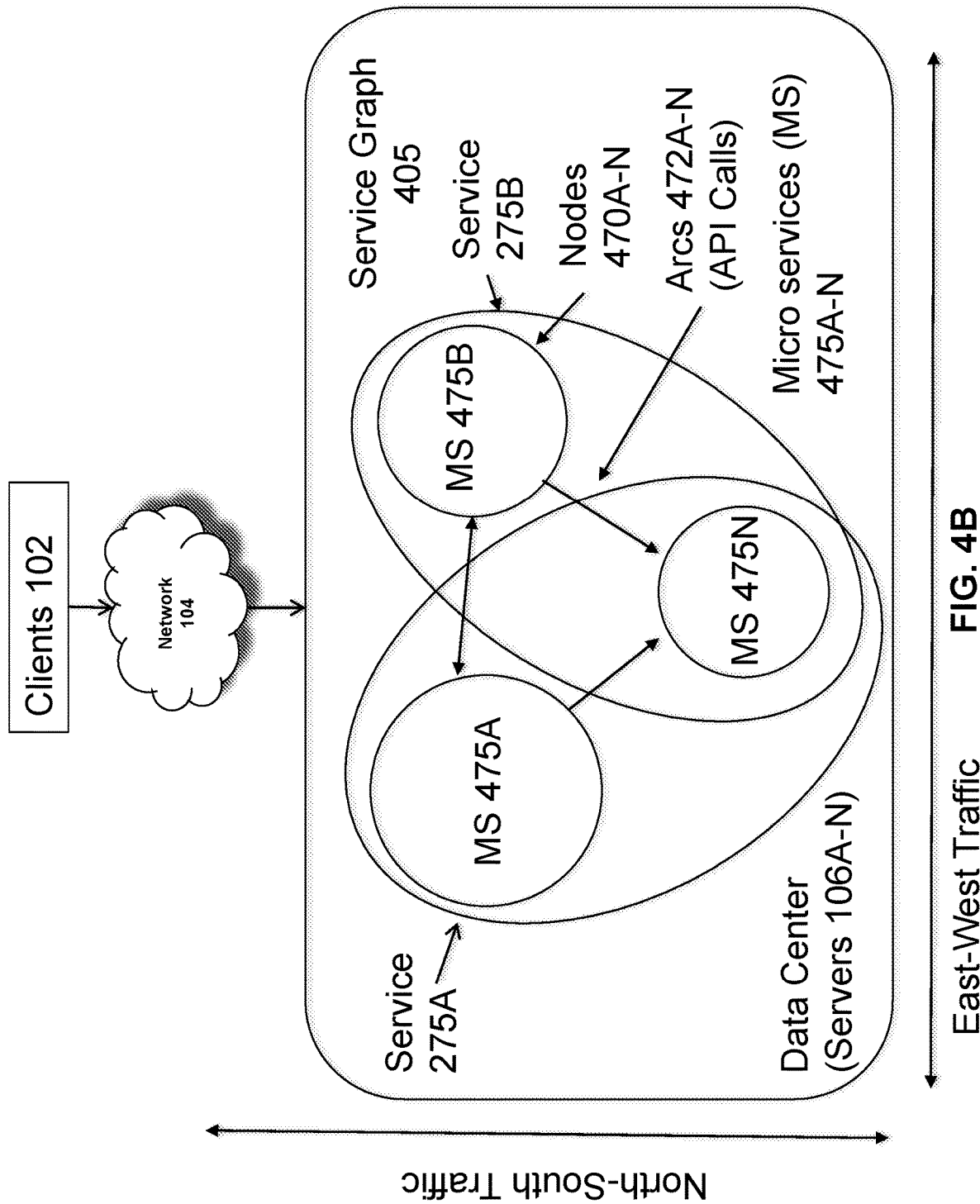
FIG. 4B is a block diagram of a service graph, in accordance with an illustrative embodiment.
Figure 4C:
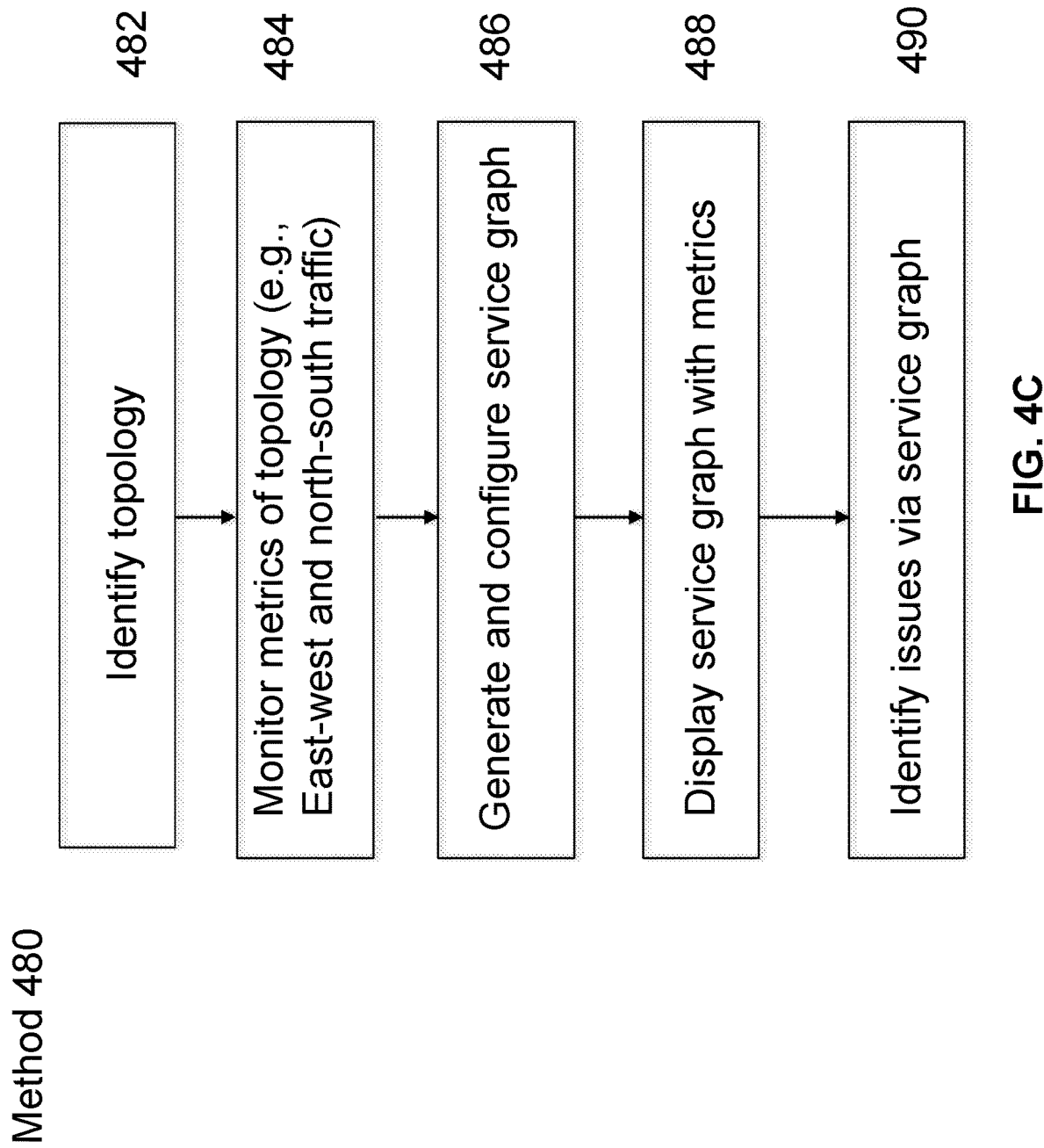
FIG. 4C is a flow diagram of a method of using a service graph, in accordance with an illustrative embodiment.

Referring now to FIGS. 4A-4C, implementation of systems and methods for a service graph based platform and technology will be discussed. A service graph is a useful technology tool for visualizing a service by its topology of components and network elements. Services may be made up of microservices with each microservice handling a particular set of one or more functions of the service. Network traffic may traverse the service topology such as a client communicating with a server to access service (e.g., north-south traffic). Network traffic of a service may include network traffic communicated between microservices of the services such as within a data center or between data centers (e.g., east-west traffic). The service graph may be used to identify and provide metrics of such network traffic of the service as well as operation and performance of any network elements used to provide the service. Service graphs may be used for identifying and determining issues with the service and which part of the topology causing the issue. Services graphs may be used to provide for administering, managing and configuring of services to improve operational performance of such services.

Referring to FIG. 4A, an implementation of a system for service graphs, such as those illustrated in FIG. 4B, will be described. A device on a network, such as a network device 200, 205 or a server 206, may include a service graph generator and configurator 412, a service graph display 414 and service graph monitor 416. The service graph generator and configurator 412 (generally referred to as service graph generator 412), may identify a topology 410 of elements in the network and metrics 418 related to the network and the elements, to generate and/or configure service graphs 405A-N. The service graphs 405A-N (generally referred to as service graphs 405) may be stored in one or more databases, with any of the metric 418' and/or topology 410'. The service graphic generator 412 may generate data of the service graphs 405 to be displayed in a display or rendered form such as via a user interface, generated referred to as service graph display 414. Service graph monitor 416 may monitor the network elements of the topology and service for metrics 418 to configure and generate a service graph 405 and/or to update dynamically or in real-time the elements and metrics 418 of or represented by a service graph display 414.

The topology 410 may include data identifying, describing, specifying or otherwise representing any elements used, traversed in accessing any one or more services or otherwise included with or part of such one or more services, such as any of the services 275 described herein. The topology may include data identifying or describing any one or more networks and network elements traversed to access or use the services, including any network devices, routers, switches, gateways, proxies, appliances, network connections or links, Internet Service Providers (ISPs), etc. The topology may include data identifying or describing any one or more applications, software, programs, services, processes, tasks or functions that are used or traversed in accessing a service. In some implementations, a service may be made up or include multiple microservices, each providing one or more functions, functionality or operations of or for a service. The topology may include data identifying or describing any one or more components of a service, such as programs, functions, applications or microservices used to provide the service. The topology may include parameters, configuration data and/or metadata about any portion of the topology, such as any element of the topology.

A service graph 405 may include data representing the topology of a service 275, such any elements making up such a service or used by the service, for example as illustrated in FIG. 4B. The service graph may be in a node base form, such as graphical form of nodes and each node representing an element or function of the topology of the service. A service graph may represent the topology of a service using nodes connected among each other via various connectors or links, which may be referred to as arcs. The arc may identify a relationship between elements connected by the arc. Nodes and arcs may be arranged in a manner to identify or describe one or more services. Nodes and arcs may be arranged in a manner to identify or describe functions provided by the one or more services. For example, a function node may represent a function that is applied to the traffic, such as a transform (SSL termination, VPN gateway), filter (firewalls), or terminal (intrusion detection systems). A function within the service graph might use one or more parameters and have one or more connectors.

The service graph may include any combination of nodes and arcs to represent a service, topology or portions thereof. Nodes and arcs may be arranged in a manner to identify or describe the physical and/or logical deployment of the service and any elements used to access the service. Nodes and arcs may be arranged in a manner to identify or describe the flow of network traffic in accessing or using a service. Nodes and arcs may be arranged in a manner to identify or describe the components of a service, such as multiple microservices that communicate with each other to provide functionality of the service. The service graph may be stored in storage such as a database in a manner in order for the service graph generator to generate a service graph in memory and/or render the service graph in display form 414.

The service graph generator 412 may include an application, program, library, script, service, process, task or any type and form of executable instructions for establishing, creating, generating, implementing, configuring or updating a service graph 405. The service graph generator may read and/or write data representing the service graph to a database, file or other type of storage. The service graph generator may comprise logic, functions and operations to construct the arrangement of nodes and arcs to have an electronic representation of the service graph in memory. The service graph generator may read or access the data in the database and store data into data structures and memory elements to provide or implement a node based representation of the service graph that can be updated or modified. The service graph generator may use any information from the topology to generate a service graph. The service graph generator may make network calls or use discovery protocols to identify the topology or any portions thereof. The service graph generator may use any metrics, such as in memory or storage or from other devices, to generate a service graph. The service graph generator may comprise logic, functions and operations to construct the arrangement of nodes and arcs to provide a graphical or visual representation of the service graph, such as on a user interface of a display device. The service graph generator may comprise logic, functions and operations to configure any node or arc of the service graph to represent a configuration or parameter of the corresponding or underlying element represented by the node or arc. The service graph generator may comprise logic, functions and operations to include, identify or provide metrics in connection with or as part of the arrangement of nodes and arcs of the service graph display. The service graph generator may comprise an application programming interface (API) for programs, applications, services, tasks, processes or systems to create, modify or interact with a service graph.

The service graph display 414 may include any graphical or electronic representation of a service graph 405 for rendering or display on any type and form of display device. The service graph display may be rendered in visual form to have any type of color, shape, size or other graphical indicators of the nodes and arcs of the service graph to represent a state or status of the respective elements. The service graph display may be rendered in visual form to have any type of color, shape, size or other graphical indicators of the nodes and arcs of the service graph to represent a state or status of one or more metrics. The service graph display may comprise any type of user interface, such as a dashboard, that provides the visual form of the service graph. The service graph display may include any type and form of user interface elements to allow users to interact, interface or manipulate a service graph. Portion of the service graph display may be selectable to identify information, such as metrics or topology information about that portion of the service graph. Portions of the service graph display may provide user interface elements for users to take an action with respect to the service graph or portion thereof, such as to modify a configuration or parameter of the element.

The service graph monitor 418 may include an application, program, library, script, service, process, task or any type and form of executable instructions to receive, identify, process metrics 418 of the topology 410. The service graph monitor 418 monitors via metrics 418 the configuration, performance and operation of elements of a service graph. The service graph monitor may obtain metrics from one or more devices on the network. The service graph monitor may identify or generate metrics from network traffic traversing the device(s) of the service graph monitor. The service graph monitor may receive reports of metrics from any of the elements of the topology, such as any elements represented by a node in the service graph. The service graph monitor may receive reports of metrics from the service. From the metrics, the service graph monitor may determine the state, status or condition of an element represented in or by the service graph, such as by a node of the service graph. From the metrics, the service graph monitor may determine the state, status or condition of network traffic or network connected represented in or by the service graph, such as by an arc of the service graph. The service graph generator and/or service graph monitor may update the service graph display, such as continuously or in predetermined frequencies or event based, with any metrics or any changed in the state, status or condition of a node or arc, element represented by the node or arc, the service, network or network traffic traversing the topology.

The metrics 418, 418' (generally referred to as metrics 418) may be stored on network device in FIG. 4B, such as in memory or storage. The metrics 418, 418' may be stored in a database on the same device or over a network to another device, such as a server. Metrics may include any type and form of measurement of any element of the topology, service or network. Metrics may include metrics on volume, rate or timing of requests or responses received, transmitted or traversing the network element represented by the node or arc. A Metrics may include metrics on usage of a resource by the element represented by the node or arc, such as memory, bandwidth. Metrics may include metrics on performance and operation of a service, including any components or microservices of the service, such as rate of response, transaction responses and times.

FIG. 4B illustrates an implementation of a service graph in connection with microservices of a service in view of east-west network traffic and north-south network traffic. In brief overview, clients 102 may access via one or more networks 104 a data center having servers 106A-106N (generally referred to as servers 106) providing one or more services 275A-275N (generally referred to as services 275). The services may be made up multiple microservices 475A-475N (generally referred to as microservice or micro service 475). Service 275A may include microservice 475A and 475N while service 275B may include microservice 475B and 475N. The microservices may communicate among the microservices via application programming interface (APIs). A service graph 405 may represent a topology of the services and metrics on network traffic, such as east-west network traffic and north-south network traffic.

North-south network traffic generally describes and is related to network traffic between clients and servers, such as client via networks 104 to servers of data center and/or servers to clients via network 104 as shown in FIG. 4B. East-west network traffic generally describes and is related to network traffic between elements in the data centers, such as data center to data center, server to server, service to service or microservice to microservice.

A service 275 may comprise microservices 475. In some aspects, microservices is a form of service-oriented architecture style wherein applications are built as a collection of different smaller services rather than one whole or singular application (referred to sometimes as a monolithic application). Instead of a monolithic application, a service has several independent applications or services (e.g., microservices) that can run on their own and may be created using different coding or programming languages. As such, a larger server can be made up of simpler and independent programs or services that are executable by themselves. These smaller programs or services are grouped together to deliver the functionalities of the larger service. In some aspects, a microservices based service structures an application as a collection of services that may be loosely coupled. The benefit of decomposing a service into different smaller services is that it improves modularity. This makes the application or service easier to understand, develop, test, and be resilient to changes in architecture or deployment.

A microservice includes an implementation of one or more functions or functionality. A microservice may be a self-contained piece of business function(s) with clear or established interfaces, such as an application programming interface (API). In some implementations, a microservice may be deployed in a virtual machine or a container. A service may use one or more functions on one microservice and another one or more functions of a different microservice. In operating or executing a service, one microservice may make API calls to another microservice and the microservice may provide a response via an API call, event handler or other interface mechanism. In operating or executing a microservice, the microservice may make an API call to another microservice, which in its operation or execution, makes a call to another microservice, and so on.

The service graph 405 may include multiple nodes 470A-N connected or linked via one or more or arcs 472A-472N. The service graph may have different types of nodes. A node type may be used to represent a physical network element, such as a server, client, appliance or network device. A node type may be used to represent an end point, such as a client or server. A node type may be used to represent an end point group, such as group of clients or servers. A node type may be used to represent a logical network element, such as a type of technology, software or service or a grouping or sub-grouping of elements. A node type may be used to represent a functional element, such as functionality to be provided by an element of the topology or by the service.

The configuration and/or representation of any of the nodes 470 may identify a state, a status and/or metric(s) of the element represented by the node. Graphical features of the node may identify or specify an operational or performance characteristic of the element represented by the node. A size, color or shape of the node may identify an operational state of whether the element is operational or active. A size, color or shape of the node may identify an error condition or issue with an element. A size, color or shape of the node may identify a level of volume of network traffic, a volume of request or responses received, transmitted or traversing the network element represented by the node. A size, color or shape of the node may identify a level of usage of a resource by the element represented by the node, such as memory, bandwidth, CPU or storage. A size, color or shape of the node may identify relativeness with respect to a threshold for any metric associated with the node or the element represented by the node.

The configuration and/or representation of any of the arcs 472 may identify a state, status and/or metric(s) of the element represented by the arc. Graphical features of the arc may identify or specify an operational or performance characteristic of the element represented by the arc. A size, color or shape of the node may identify an operational state of whether the network connection represented by the arc is operational or active. A size, color or shape of the arc may identify an error condition or issue with a connection associated with the arc. A size, color or shape of the arc may identify an error condition or issue with network traffic associated with the arc. A size, color or shape of the arc may identify a level of volume of network traffic, a volume of request or responses received, transmitted or traversing the network connection or link represented by the arc. A size, color or shape of the arc may identify a level of usage of a resource by network connection or traffic represented by the arc, such as bandwidth. A size, color or shape of the node may identify relativeness with respect to a threshold for any metric associated with the arc. In some implementations, a metric for the arc may include any measurement of traffic volume per arc, latency per arc or error rate per arc.

Referring now to FIG. 4C, an implementation of a method for generating and displaying a service graph will be described. In brief overview of method 480, at step 482, a topology is identified, such as for a configuration of one or more services. At step 484, the metrics of elements of the topology, such as for a service are monitored. At step 486, a service graph is generated and configured. At step 488, a service graph is displayed. At step 490, issues with configuration, operation and performance of a service or the topology may be identified or determined.

At step 482, a device identifies a topology for one or more services. The device may obtain, access or receive the topology 410 from storage, such as a database. The device may be configured with a topology for a service, such as by a user. The device may discover the topology or portions therefore via one more discovery protocols communicated over the network. The device may obtain or receive the topology or portions thereof from one or more other devices via the network. The device may identify the network elements making up one or more services. The device may identify functions providing the one or more services. The device may identify other devices or network elements providing the functions. The device may identify the network elements for north-west traffic. The device may identify the network elements for east-west traffic. The device may identify the microservices providing a service. In some implementations, the service graph generator establishes or generates a service graph based on the topology. The service graph may be stored to memory or storage.

At step 484, the metrics of elements of the topology, such as for a service are monitored. The device may receive metrics about the one or more network elements of the topology from other devices. The device may determine metrics from network traffic traversing the device. The device may receive metrics from network elements of the topology, such as via reports or events. The device may monitor the service to obtain or receive metrics about the service. The metrics may be stored in memory or storage, such as in association with a corresponding service graph. The device may associate one or more of the metrics with a corresponding node of a service graph. The device may associate one or more of the metrics with a corresponding arc of a service graph. The device may monitor and/or obtain and/or receive metrics on a scheduled or predetermined frequency. The device may monitor and/or obtain and/or receive metrics on a continuous basis, such as in real-time or dynamically when metrics change.

At step 486, a service graph is generated and configured. A service graph generator may generate a service graph based at least on the topology. A service graph generator may generate a service graph based at least on a service. A service graph generator may generate a service graph based on multiple services. A service graph generator may generate a service graph based at least on the microservices making up a service. A service graph generator may generate a service graph based on a data center, servers of the data center and/or services of the data center. A service graph generator may generate a service graph based at least on east-west traffic and corresponding network elements. A service graph generator may generate a service graph based at least on north-south traffic and corresponding network elements. A service graph generator may configure the service graph with parameters, configuration data or metadata about the elements represented by a node or arc of the service graph. The service graph may be generated automatically by the device. The service graph may be generated responsive to a request by a user, such as via a comment to or user interface of the device.

At step 488, a service graph is displayed. The device, such as via service graph generator, may create a service graph display 414 to be displayed or rendered via a display device, such as presented on a user interface. The service graph display may include visual indicators or graphical characteristics (e.g., size, shape or color) of the nodes and arcs of the service graph to identify status, state or condition of elements associated with or corresponding to a node or arc. The service graph display may be displayed or presented via a dashboard or other user interface in which a user may monitor the status of the service and topology. The service graph display may be updated to show changes in metrics or the status, state and/or condition of the service, the topology or any elements thereof. Via the service graph display, a user may interface or interact with the service graph to discover information, data and details about any of the network elements, such as the metrics of a microservice of a service.

At step 490, issues with configuration, operation and performance of a service or the topology may be identified or determined. The device may determine issues with the configuration, operation or performance of a service by comparing metrics of the service to thresholds. The device may determine issues with the configuration, operation or performance of a service by comparing metrics of the service to previous or historical values. The device may determine issues with the configuration, operation or performance of a service by identifying a change in a metric. The device may determine issues with the configuration, operation or performance of a service by identifying a change in a status, state or condition of a node or arc or elements represented by the node or arc. The device may change the configuration and/or parameters of the service graph. The device may change the configuration of the service. The device may change the configuration of the topology. The device may change the configuration of network elements making up the topology or the service. A user may determine issues with the configuration, operation or performance of a service by reviewing, exploring or interacting with the service graph display and any metrics. The user may change the configuration and/or parameters of the service graph. The user may change the configuration of the service. The user may change the configuration of the topology. The device may change the configuration of network elements making up the topology or the service.

E. Generating a Service Graph for Canary Deployment

The present disclosure is directed towards generating service graphs for canary deployments of microservices. In embodiments, a canary version of a single microservice can be deployed within a call chain of a plurality of microservices to individually upgrade the respective microservice in the call chain or network independent of the other microservices. The canary deployment can be used to introduce a new version of an application or microservice and reduce potential risk in production. For example, a canary version for at least one microservice in the call chain can be deployed and the remaining microservices forming the call chain can execute production versions. A portion of network traffic (e.g., client requests) can be provided to the call chain having the microservice executing the canary version. The parameters for transactions performed by canary version microservices and transactions performed by production version microservices can be collected and monitored. A service graph can be generated to identify and distinguish between the transactions performed by the microservice executing the canary version and the microservices executing the production versions in handling the network traffic. The service graph can be used to visualize the canary deployment and identify issues across microservices due to introduction of the new version of a microservice of a plurality of microservices forming the call chain.

In a microservice architecture, network traffic and client requests can be passed through a series or network of microservices (e.g., call chain) and one or more of the microservice can process the request. The communication between the individual microservices can be difficult to monitor and difficult to identify issues at a particular microservice or between different microservices instead of the entire call chain. For example, if a canary deployment of a particular microservice has issues or goes rogue, a network administrator should be able to spot the behavioral difference across the individual microservices. The systems, methods and techniques described herein can provide for tagging of communications between microservices, including canary versions of the microservices, to identify transactions processed at canary versions of microservices and transactions processed at production versions of microservices. For example, the canary version of a microservice can include an identifier in a header of a request being processed by the respective microservice. The identifier can indicate the respective microservice is a canary version of the microservice. The microservice can pass the request with the identifier to the remaining one or more microservices in the call chain and the one or more remaining microservices can retain the identifier with the request through the end of the call chain.

A service graph can be generated, using the identifier, to identify and differentiate production and canary traffic within the call chain and/or within a network. The service graph can be used to identify issues or anomalies caused due to the introduction of the canary version of a microservice to the call chain or network of microservices. The service graphs as described herein can provide a comprehensive view of service to service communication and microservice to microservice communication to aid in analyzing network issues that can be buried under a number of libraries and the network of microservices. For example, there can be tight coupling between microservices and changes in one microservice can affect the working and/or performance of other microservices in a common call chain and/or in a common network. These issues can be difficult to analyze for individual microservices to between microservices.

In canary deployment, a portion (e.g., small percentage, less than half) of traffic can be forwarded to the canary version when the canary version of a microservice is initially deployed. Therefore, potential issues with the canary version may not bubble up or be identifiable as the majority of traffic is still processed by healthy production versions of microservices not experiencing any degradation. As described herein, a canary version of a microservice can include or insert an identifier (e.g., tag) before forwarding a request to one or more downstream microservices or one or more subsequent microservices in the common call chain. The identifier can indicate that the canary version of the microservice processed the request. The one or more subsequent microservices in the call chain can retain the identifier with the request through the last microservice in the call chain. A service graph can be generated, based on the identifier, to identify transactions processed by the canary version of the microservice and/or transactions processed by production versions of one or more microservices. In embodiments, the identifier can be included into a header portion of the request, such as but not limited to, a custom Hypertext Transfer Protocol (HTTP) header identifying the canary version of the microservice (or application) that processed the transaction. In embodiments, the HTTP headers can be logged as part of transaction logs and be used to generate the service graphs. The service graphs can be used to monitor the communications between the microservices to determine statistics such as, but not limited to, call counts, times, and/or success rates for incoming calls. The service graphs can be used to identify issues, such as but not limited to, reduced response time and identify failures between different microservices to reduce time to resolution for inter-service failures.

Referring now to FIGS. 5A-5B, in FIG. 5A depicted is a system 500 having an intermediary device 510, intermediary to a plurality of clients 102 and a plurality of call chains 504, each having a plurality of microservices 475. FIG. 5B depicts a block diagram of a system 550 having a first call chain 504a and a second call chain 504b for processing network traffic from one or more clients 102. The traffic can include, but not limited to, requests 502 generated by clients 102 to access an application or service 275. In embodiments, two or more microservices 475 can be grouped together or interact with each other to provide the functionality or skills of at least one application or service 275. The microservices 475 can be grouped together and form a call chain 504 to provide the functionality or skills of at least one application or service 275.

The device 510 can include a proxy or a gateway to monitor calls and traffic, and route calls and traffic between a plurality of microservices 475 and/or between the clients 102 and the microservices 475. The device 510 can include a server. The device 510 can include one or more processors 512 coupled to a memory 514. The processor 512 can include or be coupled to a non-volatile memory 514 that stores computer instructions and an operating system. For example, the computer instructions can be executed by the processor 512 out of volatile memory 514 to perform all or part of the method 600.

The device 510 can be implemented using hardware or a combination of software and hardware. For example, each component of the device 510 can include logical circuity (e.g., a central processing unit or CPU) that responses to and processes instructions fetched from a memory unit (e.g., memory 514). Each component of the device 510 can include or use a microprocessor or a multi-core processor. A multi-core processor can include two or more processing units on a single computing component. Each component of the device 510 can be based on any of these processors, or any other processor capable of operating as described herein. Each processor can utilize instruction level parallelism, thread level parallelism, different levels of cache, etc. For example, the device 510 can include at least one logic device such as a computing device or server having at least one processor to communicate via a network 104. The components and elements of the device 510 can be separate components or a single component. For example, the device 510 can include combinations of hardware and software, such as one or more processors configured to initiate stop commands, initiate motion commands, and transmit or receive event data, for example. The device 510 can include a structured set of data. For example, the device 510 can include and/or store a plurality of metadata 516 corresponding to a call chain 504, one or more microservices 475, and/or one or more requests 502.

The device 510 can include a memory component (e.g., memory 514) to store and retrieve data. The memory 514 can include a random access memory (RAM) or other dynamic storage device, coupled with the device 510 for storing information, and instructions to be executed by the device 510. The memory 514 can include at least one read only memory (ROM) or other static storage device coupled with the device 510 for storing static information and instructions for the device 510. The memory 514 can include a storage device, such as a solid state device, magnetic disk or optical disk, coupled with the device 510 to persistently store information and instructions.

The device 510 manage a plurality of microservices 475. The plurality of microservices 475 can couple with or otherwise interact with the device 510. In embodiments, the plurality of microservices 475 can be a component of one or more services 275. For example, the microservices 475 can be the same as or substantially similar to microservices 475A-475N described above with respect to FIGS. 4A-4C. For example, two or more microservices 475 can be grouped together or interact with each other to provide the functionality or skills of at least one service 275. The microservices 475 can communicate with one or more other microservices 475 via application programming interface (APIs). In some embodiments, the microservices 475 can couple with or receive requests 502 from the device 510 via one or more channels 530. The channels 530 can include a session or connection between the device 510 and at least one microservice 475. In some embodiments, the channels 530 can include a session or connection between two or more microservices 475. The channel 530 may include encrypted and/or secure sessions established between the device 510 and at least one microservice 475 or between two or more microservices 475. The encrypted session can include an encrypted connection between a device 510 and at least one microservice 475 or between two or more microservices 475.

In embodiments, the device 510 can organize or arrange two or more microservices 475 into a call chain 504. A call chain 504 can include a plurality of requests 502 corresponding to a plurality of microservices 475. In embodiments, the call chain 504 can include a plurality of requests 502 corresponding to a first microservice 475a through a last microservice 475n accessed responsive to an initial or first request 502a. The call chains 504 can include different versions of microservices 475, for example, being deployed for testing or integration purposes. In embodiments, a first call chain 504a can include a first microservice 475a executing a canary version 506 of the first microservice 475a, a second microservice 475b executing a production version 508 of the second microservice 475b, a third microservice 475c executing a production version 508 of the third microservice 475c, and a Nth microservice 475n executing a production version 508 of the Nth microservice 475n. A second call chain 504b can include the first microservice 475a executing a production version 508 of the first microservice 475a, the second microservice 475b executing a production version 508 of the second microservice 475b, the third microservice 475c executing a production version 508 of the third microservice 475c, and the Nth microservice 475n executing a production version 508 of the Nth microservice 475n. The number of call chains 504 and/or microservices 475 can vary, for example, based in part on a size of a network 104 and/or a number of services 275. For example, the network of microservices 475 can include a single call chain 504 or two or more call chains 504.

In embodiments, the device 510 can generate and/or maintain a service graph 405 for a call chain 504. For example, the device 510 can generate at least one service graph 405 for each call chain 504. In embodiments, the device 510 can generate a service graph 405 that includes multiple call chains 504. The service graph 405 can be the same as or substantially similar to the service graphs 405 described above with respect to FIGS. 4A-4C. In embodiments, the device 510 can generate the service graph 405 to include data representing the topology of a service 275 or a plurality of microservices 475 for one or more call chains 504. The service graph 405 can illustrate or show dependencies of the plurality of microservices 475 associated with a call chain 504. A dependency, can include, but not limited to, a relationship between at least two microservices 475. For example, a dependency can correspond to an order in which one or more microservices 475 work together, are grouped together (e.g., call chain 504) or collectively respond to one or more requests 502. The dependency can include a reliance of at least one microservice 475 to use the functionality, skill or services of at least one other microservice 475 to handle or execute a request 502 or multiple requests 502.

The service graph 405 can illustrate and/or differentiate between canary versions 506 of microservices 475 and production versions 508 of microservices 475. For example, the service graph 405 can include different indicators 528 to distinguish between a canary version 506 of a microservice 475 and a production version 508 of a microservice 475. In embodiments, the service graph 405 can include a first indicator 528 for the one or more transactions performed by a microservice 475 executing the canary version 506 of the respective microservice 475 and a second indicator 528 for one or more transactions performed by a microservice executing the production version 508 of the respective microservice. The indicators 528 can include, but not limited to, a different color, a different line pattern (e.g., dashed, dotted, varied), and/or different line properties (e.g., varied thickness, varied widths). The service graph 405 can be generated to include transaction parameters including, but not limited to, response time, a failure between two or more microservices 475, a number of times each microservice 475 has been called, and a rate of success of using the respective microservices 475.

The device 510 can include a database 518. The database 518 can include a structured set of data (e.g., metadata 516 stored for the device 510). For example, the database 518 can include one or more call chains 504 or call chain data. The database 518 can include metadata 516. The metadata 516 can correspond to or include data or information associated with one or more microservices 475, one or more requests 502, one or more call chains 504 and/or one or more service graphs 405. In some embodiments, the metadata 516 can include statistics associated with one or more calls between a plurality of microservices 475, call counts, call times, response times, success rates and/or failure rates. In embodiments, the device 510 can generate a call chain 504 to include metadata 516. For example, the device 510 can generate a call chain 504 to include metadata 516 attached or included with one or more requests 502 of the respective call chain 504.

The metadata 516 can include one or more identifier 520 generated by one or more microservices 475 to indicate the version (e.g., canary version 506, production version 508) the respective microservice 475 is executing during a transaction with a request 502. The device 510 can collect and maintain one or more identifiers 520 generated by microservices 475 in the database 518. A microservice 475 can include or insert a first identifier 520 into a header portion 522 of a request to indicate the microservice 475 is executing a canary version 506 of the respective microservice 475. A microservice 475 can include or insert a second identifier 520 into a header portion 522 of a request to indicate the microservice 475 is executing a production version 508 of the respective microservice 475. The identifier 520 can include a tag, a script, code, metadata, and/or a unique identifier (ID) included within a header portion 522 of a request 502 to indicate or identify a version of a microservice 475.

The metadata 516 can include one or more tags 524 generated by one or more microservices 475 to indicate the version (e.g., canary version 506, production version 508) the respective microservice 475 is executing during a transaction with a request 502. The device 510 can collect and maintain one or more tags 524 generated by microservices 475 in the database 518. The tag s524 can include an identifier, a script, code, metadata, and/or a unique identifier (ID) included within a header portion 522 of the request 502 to indicate or identify the version of a microservice 475. For example, the microservice 475 can generate the tag 524 to identify that the microservice 475 is executing the production version 508 of the respective microservice 475.

The device 510 can collect and maintain parameters corresponding to transaction performed by the microservices when processing one or more requests 502 in the database 518. The parameters 526 can include, but not limited to, a response time of the respective microservice 475 performing one or more transactions. The parameters 526 can include, but not limited to, a failure between the two or more microservices 475, a number of times each microservice 475 of the plurality of microservices 475 has been called, and a rate of success of using the plurality of microservices 475 of the call chain 504. The device 510 can determine parameters 526 corresponding to transactions processed by one or more canary versions 506 of one or more microservices 475 and parameters 526 corresponding to transactions processed by one or more production versions 508 of one or more microservices 475. In embodiments, the device 510 can group and/or organize parameters 526 based in part on the respective call chain 504, the microservice 475 involved, a canary version 506 of a microservice 475, and/or a production version 508 of a microservice 475.

A canary version 506 can include a new version of a particular microservice 475, service 275 or application. For example, a canary version 506 can include a modification to an existing version of a microservice 475, an upgrade to one or more functionalities of an existing version of a microservice 475, a new version of a microservice 475 and/or a test version of a microservice 475. In embodiments, a canary version 506 of a microservice 475 can include one or more modified functionalities, a new software version, and/or one or more new features of a version of a microservice 475 as compared to a production version 508 of the same microservice 475. The production version 508 can include or correspond to an existing and/or executing version of a microservice 475. The production version 508 can include or correspond to a previous version of a microservice 475 or a tested version of a microservice 475.

Network 104 may be a public network, such as a wide area network (WAN) or the Internet. In some embodiments, network 104 may be a private network such as a local area network (LAN) or a company Intranet. Network 104 may be the same as or substantially similar to network 104 described above with respect to FIGS. 1A-1B and 4A-4B.

Each of the above-mentioned elements or entities is implemented in hardware, or a combination of hardware and software, in one or more embodiments. Each component of the device 510 may be implemented using hardware or a combination of hardware or software detailed above in connection with FIGS. 1-4C. For instance, each of these elements or entities can include any application, program, library, script, task, service, process or any type and form of executable instructions executing on hardware of a client device (e.g., device 510). The hardware includes circuitry such as one or more processors in one or more embodiments.

Referring now to FIGS. 6A-6B, depicted is a flow diagram of one embodiment of a method 600 for generating a service graph to differentiate between canary versions of microservices and production versions of microservices. The functionalities of the method 600 may be implemented using, or performed by, the components detailed herein in connection with FIGS. 1-5B. In brief overview, the method 600 can include one or more of: deploying a version of a microservice (605), partitioning traffic (610), receiving a request (615), generating an identifier (620), forwarding a request to a subsequent microservice (625), processing a request at a subsequent microservice (630), determining if end of call chain (635), if so, determining parameters of one or more transaction (640), determining any differences between versions (645), generating a service graph (650), if not, returning to (625) to forward the request to a subsequent microservice (655). Any of the foregoing operations may be performed by any one or more of the components or devices described herein, for example, the device 510, processor 512 or one or more microservices 475.

Referring to (605), and in some embodiments, a version of a microservice 475 can be deployed. In embodiments, a microservice architecture or network of microservices 475 can be formed having a plurality of microservices 475 to handle and process one or more requests 502 from one or more clients 102. The requests 502 can include requests to access to interact with an application or service 275. The microservices 475 can interact with each other or be grouped together to provide the functionality or skills of at least one application or service 275. In embodiments, the microservices 475 can be grouped, organized or communicate with each other in the form of a call chain 504. The call chain 504 can include two microservices 475 or more than two microservices 475 that forward or pass requests 502 through the call chain 504 in a determined order until the respective requests 502 are processed at the last microservice 475 of the call chain 504.

The network of microservices 475 can execute or run production versions 508 of the respective microservices 475. A production version 508 can include, but not limited to, an existing or active version of a microservice 475. A production version 508 can include, but not limited to, a microservice 475 that has been previously tested. The device 510 can use canary deployment to modify, upgrade or replace individual microservices 475 (e.g., production versions 508 of microservices 475) in the network of microservices 475 to minimize and reduce an impact on the network. The device 510 can select at least one microservice 475 of the plurality of microservices 475 to be modified, upgraded or replaced with a new version through canary deployment. The device 510 can select the microservice 475 based in part on a determined order, for example, based on age, order within a call chain 504 and/or based in part of the date of a last or previous upgrade. In embodiments, the device 510 can randomly select a microservice 475 to be modified through canary deployment. The device 510 can deploy a canary version 506 of a single microservice 475 at a time. In embodiments, the device 510 can deploy two or more canary versions 506 of two or more microservices at a time. The device 510 can select a first microservice 475 in a call chain 504 to deploy a canary version 506 for the first microservice 475. In embodiments, the device 510 can select a subsequent microservice 475 downstream from the first microservice 475 in the call chain 504 to deploy a canary version 506 for the subsequent microservice 475. In embodiments, a canary version 506 of a microservice 475 can include one or more modified functionalities, a new software version, and/or one or more new features of a version of a microservice 475 as compared to a production version 508 of the same microservice 475.

Referring to (610), and in some embodiments, network traffic can be portioned. The device 510 can partition or select a percentage of network traffic to go through the microservice 475 executing the canary version 506. In embodiments, the device 510 can deploy multiple versions of a microservice 475 in different call chains 504 and can partition the traffic such that the different versions receive a portion of the traffic intended for the respective microservice 475. For example, the device 510 can deploy a first microservice 475 executing the canary version 506 of the first microservice 475 in a first call chain 504a to process a first portion of requests 502 from one or more clients 102 and deploy the first microservice 475 executing a production version 508 of the first microservice 475 in a second call chain 504b to process a second portion of requests 502 from the one or more clients 102. In embodiments, the first portion of requests 502 or traffic can be less than or greater than the second portion of requests 502 or traffic. In embodiments, the first portion of requests 502 or traffic can be equal to the second portion of requests 502 or traffic. The device 510 can determine or select the percentage of traffic to be received at the canary version 506 of the microservice 475 to be a smaller percentage or less traffic than a production version of the microservice 475 to test the canary version 506 of the microservice 475 and minimize any potential impact on the performance of the call chain 504 or network of microservices 475.

Referring to (615), and in some embodiments, a request can be received. The request 502 can be received from a client 102 and can be received by the device 510 or a microservice 475. In embodiments, the device 510 can receive one or more requests 502 from one or more clients 102 and can forward the requests 502 to one or more call chains 504 having a plurality of microservices 475. In embodiments, a first microservice 475 of a plurality of microservices 475 forming a first call chain 504 can receive a request 502 from a client 102. The first microservice 475 can execute a canary version 506 of the first microservice 475 and one or more subsequent microservices 475 of the first call chain 504 can execute production versions 508 of the respective one or more subsequent microservices 475. In embodiments, at least one of the one or more subsequent microservices can execute a canary version 506 of the respective microservice and the first microservice 475 can execute a production version 508 of the first microservice 5475.

The request 502 can include a call from a first microservice 475 to a second, different microservice 475. The request 502 can include a request for at least one service, execution of at least one service, at least one application and/or execution of at least one application. The request 502 can identify at least one service, at least one microservice associated with at least one service, at least one application and/or at least one microservice associated with the application. For example, a service can include a collection or plurality of microservices 475. In embodiments, a service can include, be built and/or generated using one or more microservices 475 such that each of the one or more microservices 475 perform part of the function of the respective service. In some embodiments, an application can include a collection or plurality of microservices 475. In embodiments, an application can include, be built and/or generated using one or more microservices 475 such that each of the one or more microservices 475 perform part of the function of the respective application.

Referring to (620), and in some embodiments, an identifier can be generated. A canary version 506 of a microservice 475 can generate an identifier 520 to include with the request 502. In embodiments, the first microservice 475 can include or insert into a header portion 522 of the request 502 an identifier 520 indicating the first microservice 475 is the canary version 506 of the first microservice 475 or executing the canary version 506 of the first microservice 475 when processing the respective request 502. The first microservice 475 can include or insert the identifier 520 into at least one of a Hypertext Transfer Protocol (HTTP) header portion 522 of the request 502 or a Hypertext Transfer Protocol Secure (HTTPS) header portion 522 of the request 502.

In embodiments, a microservice 475 (e.g., any microservice in a call chain 504) executing a canary version of the respective microservice 475 can include or insert an identifier 520 into a header portion 522 of the request 502 to indicate that the respective microservice 475 is executing the canary version 506 when processing the respective request 502. The identifier 520 can include a tag, a script, code, metadata, and/or a unique identifier (ID) included within the header portion 522 of the request 502 to indicate or identify the version of a microservice 475. The identifier 520 can identify the particular microservice 475, the call chain 504 the microservice 475 is included within and/or metadata 516 corresponding to a transaction performed by the microservice 475 is processing the request 502.

In embodiments, the canary version 506 of the microservice 475 can generate a custom header 522 to the request 502 and include the identifier 520 in the customer header 522 of the request 502. For example, the identifier 520 can include or indicate a canary version, the respective microservice 475, an application or service 275 the microservice 475 is associated with, and/or a particular version. In one embodiments, the identifier can include "canary version," "microservice name," "application name/service name," and/or "version (e.g. version 1 or version 2)." The customer header can be retained or maintained by the one or more subsequent microservices 475 in the call chain and executing production versions 508 as the request 502 is processed and passed through the call chain 504.

Referring to (625), and in some embodiments, the request can be forwarded to a subsequent microservice. The first microservice 475 can provide or forward to the one or more subsequent microservices 475 of the first call chain 504, the request 502 with the identifier 520. The first microservice 475 can forward the request 502 to the next microservice 475 in the call chain 504 or the subsequent microservice 475 that is downstream from the first microservice 475 in the call chain 504. The first microservice 475 can determine the next or subsequent microservice 475 to provide the request to using the call chain 504 and/or metadata 516 corresponding to the call chain 504. For example, the first microservice 475 can identify the next microservice 475 in the call chain 504 and provide the request with the identifier 520 to the identified first microservice 475. In embodiments, the device 510 can instruct the first microservice 475 which microservice 475 is the next microservice 475 in the call chain 504 to the provide the request with the identifier 520.

Referring to (630), and in some embodiments, the request can be processed at the subsequent microservice. The next or subsequent microservice 475 in the call chain 504 can receive the request 502 with the identifier 520 included within the header portion 522 and generate a tag 524 to include with the request. For example, the one or more subsequent microservices 475 can include or insert one or more tags 524 in the request 502 to identify that the one or more subsequent microservices 475 are executing the production versions 508 of the one or more subsequent microservices 475 while retaining the identifier 520 with the request 502 as the request 502 is processed by the one or more subsequent microservices 475 forming the first call chain 504. The tag 524 can include an identifier, a script, code, metadata, and/or a unique identifier (ID) included within a header portion 522 of the request 502 to indicate or identify the version of a microservice 475. For example, the microservice 475 can generate the tag 524 to identify that the microservice 475 is executing the production version 508 of the respective microservice 475. The next or subsequent microservice 475 can process the request 502.

Referring to (635), and in some embodiments, a determination can be made if the end of the call chain 504 has been reached. In embodiments, the device 510 can determine if the current microservice 475 processing the request 502 or last microservice 475 to process the request 502 is the last microservice 475 in the call chain 504. For example, the device 510 can identify the current microservice 475 processing the request 502 or last microservice 475 to process the request 502 and the position of the identified microservice 475 in the call chain 504 using, for example, metadata 516. In embodiments, the device 510 can identify the current microservice 475 processing the request 502 or last microservice 475 to process the request 502 and can compare the identified microservice 475 to a listing for the call chain 504 to determine if the identified microservice 475 is the last microservice 475 in the call chain 504. In embodiments, the current microservice 475 processing the request 502 or last microservice 475 to process the request 502 can indicate to the device 510 that the respective microservice 475 is the last microservice 475 in the call chain 504 when the microservice 475 is done processing the request 502.

Referring to (640), and in some embodiments, if the end of the call chain 504 has been reached, one or more parameters can be determined. The device 510 can determine one or more transaction parameters 526 of the transactions processed by the call chain 504 in handling the request 502 and the one or more microservices 475 forming the call chain 504. The device 510 can determine the parameters 526 for the call chain 504 and/or parameters for the individual microservices 475 forming the call chain 504. In embodiments, the device 510 can identify, using the identifier, one or more transactions performed by the first microservice 475 executing the canary version 506 of the first microservice 475 and one or more transactions performed by the one or more subsequent microservices 475 executing the production versions 508 of the one or more subsequent microservices 475.

The parameters 526 can include, but not limited to, a response time of the respective microservice 475 performing one or more transactions. The parameters 526 can include, but not limited to, a failure between the two or more microservices 475, a number of times each microservice 475 of the plurality of microservices 475 has been called, and a rate of success of using the plurality of microservices 475 of the call chain 504. The device 510 can determine parameters 526 corresponding to transactions processed by one or more canary versions 506 of one or more microservices 475 and parameters 526 corresponding to transactions processed by one or more production versions 508 of one or more microservices 475. In embodiments, the device 510 can group and/or organize parameters 526 based in part on the respective call chain 504, the microservice 475 involved, a canary version 506 of a microservice 475, and/or a production version 508 of a microservice 475.

In embodiments, the device 510 can determine and maintain historical data corresponding to the call chain 504, the requests 502 associated with the call chain 504 and the dependencies between microservices 475 associated with the call chain 504. The parameters 526 can include, but not limited to, call count, call times, failure rates, and/or success rates. In embodiments, the device 510 can monitor the plurality of microservices 475 associated with the call chain 504 to determine the statistics for the respective call chain 504 and/or one or more requests 502. The device 510 can continually monitor the plurality of microservices 475 during execution of one or more requests 502 handled by the call chain 504 to determine the statistics for the respective call chain 504.

In embodiments, the device 510 can use the parameters 526 to determine to detect one or more failures are associated with the call chain 504 or to detect one or more failures that occurred during the execution of one or more requests 502 associated with the call chain 504. In some embodiments, a failure can correspond to a call to at least one microservice 475 that the respective microservice 475 did not respond to and/or did not execute the respective request 502 included with the call correctly. For example, the device 510 can monitor the interactions between the different microservices 475 to determine a failure of a first microservice 475 to call a second, different microservice 475. The device 510 can monitor the interactions between the different microservices 475 to determine a failure of a first microservice 475 to respond to or answer a call from a second, different microservice 475. The device 510 can detect one or more failures for one or more calls associated with the call chain 504. The device 510 can determine a failure rate for one or more microservices 475 of a plurality of microservices 475 of the call chain 504. In some embodiments, the device 510 can determine that no failures are associated with the call chain 504 or that no failures occurred during the execution of one or more requests 502 handled by the call chain 504.

Referring to (645), and in some embodiments, one or more differences can be determined. The device 510 can determine if parameters 526 corresponding to transactions processed by one or more canary versions 506 of one or more microservices 475 are different from parameters 526 corresponding to transactions processed by one or more production versions 508 of one or more microservices 475. The device 510 can analyze the parameters 526 to identify if any differences exist between the way a microservice 475 executing a canary version 506 performed in handling one or more requests 502 and the way a microservice 475 executing a production version 508 performed in handling one or more requests 502. For example, the device 510 can determine if a response time is different or skewed for the microservice 475 executing a canary version 506 as compared to the microservice 475 executing a production version 508. In embodiments, the microservice 475 executing a canary version 506 can have a first response time for processing a request 502 and the microservice 475 executing a production version 508 can have a second response time for processing the request 502. The first response time can be different (e.g., slower, longer) than the second response time, for example, indicating an issue or bug in the canary version 506 of the microservice 475. The device 510 can determine if a success rate, failure rate, call times, and/or call data is different for one or more microservices 475 executing canary versions 506 as compared to the one or more microservices 475 executing production versions 508. In embodiments, a microservice 475 executing a canary version 506 can have a first success rate, a first failure rate, and/or a first call time for processing a request 502 and the microservice 475 executing a production version 508 can have a second success rate, a second failure rate, and/or a second call time for processing the request 502. The first success rate, a first failure rate, and/or a first call time can be different (e.g., slower, longer) than the second success rate, second failure rate, and/or second call time, for example, indicating an issue with the canary version 506 of the microservice 475.

In embodiments, the parameters 526 corresponding to transactions processed by one or more canary versions 506 of one or more microservices 475 can be the same as the parameters 526 corresponding to transactions processed by one or more production versions 508 of one or more microservices 475. For example, the canary version 506 of a microservice 475 can perform and process one or more requests 502 in the same way (e.g., same or similar response time, same or similar success rate) as a production version 508 of the same microservice 475.

Referring to (650), and in some embodiments, a service graph can be generated. The device 510 can generate a service graph 405 identifying transactions processed by the canary version 506 of the first microservice 475 and the production versions 508 of the one or more subsequent microservices 475. The service graph 405 can be the same as or substantially similar to the service graphs 405 described above with respect to FIGS. 4A-4C. For example, the device 510 can generate the service graph 405 to include data representing the topology of a service 275 or a plurality of microservices 475 forming one or more call chains 504. The device 510 can generate the service graph 405 based in part on the determined parameters 526 for the one or more call chains 504 and a plurality of microservices 475. The device 510 can generate the service graph 405 to show the dependencies of the plurality of microservices 475 associated with one or more call chains 504. In embodiments, the device 510 can update dynamically or in real-time the elements and/or parameters 526 of or represented by a service graph 405 for a call chain 504.

The device 510 can generate the service graph 405 to distinguish between transactions performed by one or more canary versions 506 of one or more microservices 475 and transaction performed by one or more production versions 508 of one or more microservices 475. For example, the device 510 can generate the service graph 405 to include parameters 526 of the transactions processed by the first call chain 504a including the first microservice 475 executing the canary version 506 of the first microservice 475 and the parameters 526 of the transactions processed by a second call chain 504b including the first microservice 475 executing a production version 508 of the first microservice 475. The service graph 405 can illustrate differences between performance (e.g., response time, success rate, failure rate) of the first microservice 475 executing the canary version 506 and the production version 508 to identify any potential issues with the canary version 506 or the production version 508 of the first microservice 475.

The service graph 405 can be generated using different indicators 528 to distinguish or differentiate between parameters 526 corresponding to canary versions 506 and parameters 526 corresponding to production versions 508. For example, the device 510 can generate the service graph 405 to include a first indicator 528 for the one or more transactions performed by the first microservice 475 executing the canary version 506 of the first microservice 475 and a second indicator 528 for the one or more transactions performed by the one or more subsequent microservices 475 executing the production versions 508 of the one or more subsequent microservices 475. The indicators 528 can be used to distinguish (e.g., visually) between the transaction performed by canary versions 506 of microservices 475 and production versions 508 of microservices 475. The indicators 528 can include, but not limited to, a different color, a different line pattern (e.g., dashed, dotted, varied), and/or different line properties (e.g., varied thickness, varied widths). The indicators 528 can include or correspond to visual differences between a graphing of the parameters for transaction performed by canary versions 506 of microservices 475 and a graphing of the parameters for transactions performed by production versions 508 of microservices 475. In embodiments, the device 510 can generate the service graph 405 to be color coded such that the parameters for transaction performed by canary versions 506 of microservices 475 are illustrated in a first color and the parameters for transactions performed by production versions 508 of microservices 475 are illustrated in a second color, different from the first color. In one embodiment, the service graph 405 for a first call chain 504a having a second microservice 475 in the chain 504a executing a canary version 506 can include or identify parameters 526 for "Client<=>S1(P)<=>S2(C)<=>S3(P)<=>S4(P)" and be generated in a first color, with "S" corresponding to a microservice 475, "P" corresponding to a production version 508, and "C" corresponding to a canary version 506. In embodiments, the service graph 405 for a second call chain 504a not having a microservice 475 in the chain 504a executing a canary version 506 (e.g., all microservices 475 executing a production version 508) can include or identify parameters 526 for "Client<=>S1(P)<=>S2(P)<=>S3(P)<=>S4(P)" and be generated in a second color, different from the first color.

The device 510 (or administrator) can use the service graph 405 to determine one or more differences between parameters 526 of the transactions performed by a microservice (e.g., first microservice, subsequent microservice) executing the canary version 506 of the respective microservice 475 and parameters of the transactions performed by the one or more subsequent microservices (e.g., first microservice, subsequent microservices) executing the production versions 508 of the same microservices 475. The service graph 405 can be used to identify issues with one or more canary versions 506 of one or more microservices 475 by visually differentiating between the parameters for transaction performed by canary versions 506 of microservices 475 and the parameters for transactions performed by production versions 508 of microservices 475.

In embodiments, the device 510 can generate the service graph 405 of a call chain (e.g., first call chain 504a, second call chain 504b) to identify a failure between the two or more microservices 475, a number of times each microservice 475 of the plurality of microservices 475 has been called, and a rate of success of using the plurality of microservices 475 of a call chain 504. For example, the device 510 can generate the service graph 405 to illustrate or identify a failure between a first microservice 475 and a second microservice 475 of a plurality of microservices 475 associated with a call chain 504.

Referring to (655), and in some embodiments, if the end of call chain has not been reached, method 600 can return to (625). For example, the current microservice 475 processing the request 502 or last microservice 475 to process the request 502 can provide or forward the request 502 to a subsequent microservice 475. The current microservice 475 processing the request 502 or last microservice 475 to process the request 502 can forward the request 502 to the next microservice 475 in the call chain 504 or the subsequent microservice 475 that is downstream from the respective microservice 475 in the call chain 504.

Various elements, which are described herein in the context of one or more embodiments, may be provided separately or in any suitable subcombination. For example, the processes described herein may be implemented in hardware, software, or a combination thereof. Further, the processes described herein are not limited to the specific embodiments described. For example, the processes described herein are not limited to the specific processing order described herein and, rather, process blocks may be re-ordered, combined, removed, or performed in parallel or in serial, as necessary, to achieve the results set forth herein.

It will be further understood that various changes in the details, materials, and arrangements of the parts that have been described and illustrated herein may be made by those skilled in the art without departing from the scope of the following claims.

I claim:

1. A method for monitoring multiple versions of microservices, the method comprising:
    (a) receiving, by a first microservice of a plurality of microservices forming a first call chain, a request from a client, the first microservice executing a canary version of the first microservice and one or more subsequent microservices of the first call chain executing production versions of the one or more subsequent microservices;
    (b) including, by the first microservice, into a header portion of the request an identifier indicating the first microservice is the canary version of the first microservice;
    (c) providing, by the first microservice to the one or more subsequent microservices of the first call chain, the request with the identifier, the one or more subsequent microservices including one or more tags in the request to identify that the one or more subsequent microservices are executing the production versions of the one or more subsequent microservices while retaining the identifier with the request as the request is processed by the one or more subsequent microservices forming the first call chain; and
    (d) generating, by a device intermediary to the plurality of microservices, a service graph identifying transactions processed by the canary version of the first microservice and the production versions of the one or more subsequent microservices.

2. The method of claim 1, further comprising:
    deploying, by the device, the first microservice executing the canary version of the first microservice in the first call chain to process a first portion of requests from one or more clients; and
    deploying, by the device, the first microservice executing a production version of the first microservice in a second call chain to process a second portion of requests from the one or more clients.

3. The method of claim 1, further comprising:
    generating, by the device, the service graph including parameters of the transactions processed by the first call chain including the first microservice executing the canary version of the first microservice and the parameters of the transactions processed by a second call chain including the first microservice executing a production version of the first microservice.

4. The method of claim 3, wherein the parameters of the transactions include a response time of the respective microservice performing one or more transactions.

5. The method of claim 1, further comprising:
    identifying, by the device using the identifier, one or more transactions performed by the first microservice executing the canary version of the first microservice and one or more transactions performed by the one or more subsequent microservices executing the production versions of the one or more subsequent microservices.

6. The method of claim 5, further comprising:
    generating, by the device, the service graph to include a first indicator for the one or more transactions performed by the first microservice executing the canary version of the first microservice and a second indicator for the one or more transactions performed by the one or more subsequent microservices executing the production versions of the one or more subsequent microservices.

7. The method of claim 1, further comprising:
    determining, by the device using the service graph, one or more differences between parameters of the transactions performed by the first microservice executing the canary version of the first microservice and parameters of the transactions performed by the one or more subsequent microservices executing the production versions of the one or more subsequent microservices.

8. The method of claim 1, further comprising:
    inserting, by the first microservice, the identifier into at least one of a Hypertext Transfer Protocol (HTTP) header portion of the request or a Hypertext Transfer Protocol Secure (HTTPS) header portion of the request.

9. The method of claim 1, further comprising:
    generating, by the device, the service graph of the first call chain to identify a failure between the plurality of microservices, a number of times each microservice of the plurality of microservices has been called, and a rate of success of using the plurality of microservices of the first call chain.

10. A system for monitoring multiple versions of microservices, the system comprising:
    a device comprising one or more processors, coupled to memory and intermediary to a plurality of microservices forming a first call chain; and
    a first microservice of the plurality of microservices executing a canary version of the first microservice and one or more subsequent microservices of the first call chain executing production versions of the one or more subsequent microservices;
    wherein the first microservice is configured to:
        receive a request from a client;
        include into a header portion of the request an identifier indicating the first microservice is the canary version of the first microservice; and
        provide, to the one or more subsequent microservices of the first call chain, the request with the identifier, the one or more subsequent microservices including one or more tags in the request to identify that the one or more subsequent microservices are executing the production versions of the one or more subsequent microservices while retaining the identifier with the request as the request is processed by the one or more subsequent microservices forming the first call chain; and wherein the device is configured to:
generate a service graph identifying transactions processed by the canary version of the first microservice and the production versions of the one or more subsequent microservices.

11. The system of claim 10, wherein the device is further configured to:
deploy the first microservice executing the canary version of the first microservice in the first call chain to process a first portion of requests from one or more clients; and
deploy the first microservice executing a production version of the first microservice in a second call chain to process a second portion of requests from the one or more clients.

12. The system of claim 10, wherein the device is further configured to:
generate the service graph to include parameters of the transactions processed by the first call chain including the first microservice executing the canary version of the first microservice and the parameters of the transactions processed by a second call chain including the first microservice executing a production version of the first microservice.

13. The system of claim 12, wherein the parameters of the transactions include a response time of the respective microservice performing one or more transactions.

14. The system of claim 10, wherein the device is further configured to:
identify, using the identifier, one or more transactions performed by the first microservice executing the canary version of the first microservice and one or more transactions performed by the one or more subsequent microservices executing the production versions of the one or more subsequent microservices.

15. The system of claim 14, wherein the device is further configured to:
generate the service graph to include a first indicator for the one or more transactions performed by the first microservice executing the canary version of the first microservice and a second indicator for the one or more transactions performed by the one or more subsequent microservices executing the production versions of the one or more subsequent microservices.

16. The system of claim 10, wherein the device is further configured to:
determine, using the service graph, one or more differences between parameters of the transactions performed by the first microservice executing the canary version of the first microservice and parameters of the transactions performed by the one or more subsequent microservices executing the production versions of the one or more subsequent microservices.

17. The system of claim 10, wherein the device is further configured to:
insert the identifier into at least one of a Hypertext Transfer Protocol (HTTP) header portion of the request or a Hypertext Transfer Protocol Secure (HTTPS) header portion of the request.

18. The system of claim 10, wherein the device is further configured to:
generate the service graph of the first call chain to identify a failure between the plurality of microservices, a number of times each microservice of the plurality of microservices has been called, and a rate of success of using the plurality of microservices of the first call chain.

19. A non-transitory computer readable medium storing program instructions for causing one or more processors to:
receive at a first microservice of a plurality of microservices forming a first call chain, a request from a client, the first microservice executing a canary version of the first microservice and one or more subsequent microservices of the first call chain executing production versions of the one or more subsequent microservices;
include into a header portion of the request an identifier indicating the first microservice is the canary version of the first microservice;
provide, to the one or more subsequent microservices of the first call chain, the request with the identifier, the one or more subsequent microservices including one or more tags in the request to identify that the one or more subsequent microservices are executing the production versions of the one or more subsequent microservices while retaining the identifier with the request as the request is processed by the one or more subsequent microservices forming the first call chain; and
generate a service graph identifying transactions processed by the canary version of the first microservice and the production versions of the one or more subsequent microservices.

20. The non-transitory computer readable medium of claim 19, wherein the program instructions further cause the one or more processors to:
generate the service graph including parameters of the transactions processed by the first call chain including the first microservice executing the canary version of the first microservice and the parameters of the transactions processed by a second call chain including the first microservice executing a production version of the first microservice.

* * * * *